(12) United States Patent
Kubo et al.

(10) Patent No.: US 7,153,552 B2
(45) Date of Patent: Dec. 26, 2006

(54) POLARIZING PLATE AND DISPLAY

(75) Inventors: Nobuo Kubo, Hachioji (JP); Noriyasu Kuzuhara, Kunitachi (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 10/985,614

(22) Filed: Nov. 10, 2004

(65) Prior Publication Data

US 2005/0106334 A1    May 19, 2005

(30) Foreign Application Priority Data

Nov. 18, 2003 (JP) .............................. 2003-387609

(51) Int. Cl.
*G02F 1/13363* (2006.01)

(52) U.S. Cl. ...................... 428/1.31; 428/1.33; 428/1.5; 428/1.54; 349/96; 349/117; 349/118; 359/507

(58) Field of Classification Search ............... 428/1.31, 428/1.33, 1.5, 1.54; 349/7, 96–97, 117–118; 359/507
See application file for complete search history.

(56) References Cited

U.S. PATENT DOCUMENTS

| | | | |
|---|---|---|---|
| 2,897,544 A * | 8/1959 | Marks ........................ 156/494 |
| 3,955,881 A * | 5/1976 | Yaguchi et al. ............. 349/126 |
| 4,228,574 A * | 10/1980 | Culley et al. ................. 445/25 |
| 5,753,140 A * | 5/1998 | Shigemura ............. 252/299.01 |
| 5,914,073 A * | 6/1999 | Kobayashi et al. ......... 252/585 |
| 6,055,096 A * | 4/2000 | Michihata et al. .......... 359/352 |
| 6,476,892 B1 * | 11/2002 | Aminaka .................... 349/117 |

OTHER PUBLICATIONS

Abstract of JP 2000-193821, Takagi Toshiya et al, Jul. 2000.*
Abstract of JP 2001-272682, Kubo Nobuo, Oct. 2001.*
Abstract of JP 03-199201, Murayama Masahiko, Aug. 1991.*
Abstract of JP 05-197073, Hashimoto Narikazu, Aug. 1993.*
Abstract of JP05-194789, Murayama Masahiko, Aug. 1993.*
Abstract of JP 05-271471, Murayama Masahiko, Oct. 1993.*
Abstract of JP 06-107854, Murayama Masahiko, Apr. 1994.*
Abstract of JP 07-191217, Nakamura Taku, Jul. 1995.*
Abstract, JP 02-176625, Koike Yoshiro, Jul. 1990.*

* cited by examiner

*Primary Examiner*—Harold Pyon
*Assistant Examiner*—Sow-Fun Hon
(74) *Attorney, Agent, or Firm*—Lucas & Mercanti, LLP

(57) ABSTRACT

A polarizing plate provided on a surface of a liquid crystal cell of a display, containing a polarizing element, Film A and Film B each provided on each of two surfaces of the polarizing element, wherein: (i) a surface of Film B has an adhesive layer which adheres the polarizing plate to the liquid crystal cell; and (ii) concentrations of a ultraviolet absorber and a stabilizer contained in Film A and Film B, and in-plane and out-of-plane retardation values of Film B, satisfy predetermined conditions.

19 Claims, 2 Drawing Sheets

POLARIZING PLATE AND DISPLAY

TECHNICAL FIELD

The present invention relates to a polarizing plate used for a display, specifically for a liquid crystal display and a liquid crystal display using the same.

BACKGROUND

There has been used a triacetyl cellulose (TAC) film having an in-plane retardation value of substantially zero, in order to protect a polarizing element. A polarizing element is usually sandwiched between two TAC films to form a polarizing plate. In recent years, protective films for polarizing plates, represented by TAC films, have also been provided with a role of a retardation film and these protective films have become more and more functionalized. Accordingly, an environmentally resistant polarizing plate has been demanded.

A technique for preventing deterioration of these films is important to improve environmental resistance of polarizing plates. For example, a technique for preventing deterioration due to irradiation of UV rays has been disclosed in Japanese Patent Publication Open to Public Inspection (hereafter referred to as JP-A) Nos. 2000-193821 and 2001-272682 in which an ultraviolet absorber has been used to protect the polarizing element.

Improvement in durability of a polarizing plate may also be attained by adding stabilizers (for example, an antioxidant, peroxide scavenger, radical scavenger, metal deactivator, acid trapping agent and amine). Examples of stabilizers have been disclosed in JP-A Nos. 3-199201, 5-1907073, 5-194789, 5-271471 and 6-107854.

For flat panel displays, for example, liquid crystal displays, organic electroluminescent displays and PDPs, there have been the following problems, for example: (i) diversification of display size (enlargement or a mobile application); and (ii) requirements for display qualities (contrast, hue control in color displays, high resolution and wide viewing angle in liquid crystal displays), and more improvement in quality is required.

In recent years, the viewing angle property of a TFT-TN mode liquid crystal display has been greatly improved by providing two films containing a discotic liquid crystalline compound plates on both surfaces of a liquid crystal cell as has been disclosed in JP-A No. 7-191217.

The viewing angle property has also been improved by an improvement in the liquid crystal mode itself. For example, a liquid crystal display using a vertical alignment (VA) mode liquid crystal cell has been disclosed in JP-A No. 2-176625, in which liquid crystalline compounds are basically vertically oriented when a voltage is not applied to the cell. A VA mode liquid crystal display enables observation of the display within a wider angle and also enable a higher speed switching rate of images compared to displays of conventional liquid crystal modes, however, more improvements compared to CRTs, specifically, in oblique observation from angles of 45°, 135°, 225° and 315°, are still being demanded. Use of viewing angle compensation films is highly expected to improve the viewing angle.

On the other hand, when displaying a halftone of a black level and a white level, there are some liquid crystalline compounds orienting oblique to the substrate. Accordingly, brightness of the display may also differ depending on the viewing direction. In a color display, this difference may even result in a difference of perceived color.

To attain a wider viewing angle and higher contrast despite the above problems, proposed has been a multi-domain liquid crystal display, in which one picture element is divided into a plurality of domains, orientation of liquid crystalline compounds in each domain being changed by applying different electrical fields. Examples of a method to produce a multi-domain liquid crystal cell include: (i) a mask-rubbing method in which rubbing is carried out while a mask is moving (see, for example, Non-Patent Document 1); (ii) a method in which a plurality of orientation materials are used (see, for example, Non-Patent Document 2); and (iii) a method in which characteristics of an orientation film is changed by irradiation of UV rays (see Patent Document 1).

An optical compensation film has been used to widen the viewing angle of a liquid crystal display together with the multi-domain technology and, further, it has been tested for use in a VA mode liquid crystal cell. A simultaneous use of an A plate and a C plate has been proposed (see, for example, Non-Patent Document 3).

Recently, since the market of liquid crystal displays is increasing, specifically for TVs in which moving pictures are displayed and for mobile displays which tends to be largely affected by the environment, development of a largely improved polarizing plate exhibiting an improved image quality and sufficient durability, together with a display having a improved polarizing plate are strongly demanded.

(Patent Documents 1)

JP-A No. 5-210099

(Non-Patent Document 1) K. Takatori et al., "A Complementary TN LCD with Wide-Viewing Angle Grayscale", Japan Display '92, p 591

(Non-Patent Document 2) T. Kamada et al., "Wide Viewing Angle Full-Color TFT LCDs", Japan Display '92, p 886

(Non-Patent Document 3) J. Chen et al., SID '98 Digest, p 315

SUMMARY OF THE INVENTION

An object of the present invention is to provide a low cost and highly durable polarizing plate and a display using that polarizing plate, specifically to provide a polarizing plate suitable for a liquid crystal display and to provide a liquid crystal display, of which the image quality is enhanced by use of the polarizing plate.

One embodiment of the present invention is a polarizing plate provided on the surface of a liquid crystal cell of a display, containing a polarizing element, Film A and Film B each provided on each of two surfaces of the polarizing element, wherein: (i) concentrations of a ultraviolet absorber and a stabilizer contained in Film A and Film B; and (ii) in-plane and out-of-plane retardation values of Film B, satisfy predetermined conditions.

DESCRIPTION OF THE PREFERRED EMBODIMENTS

Figure 1:
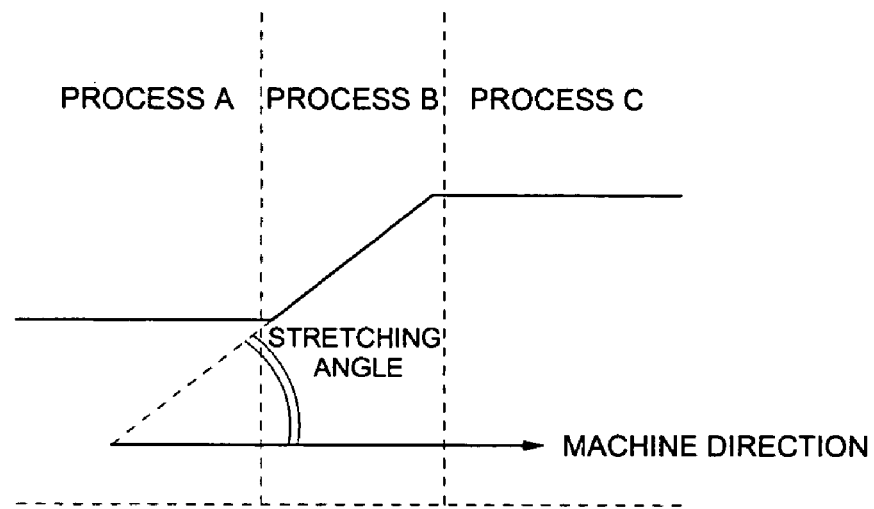
FIG. 1 is a schematic drawing explaining a stretching angle.

The preferred embodiments for practice of the present invention will now be described, however, the present invention is not limited thereto.

(1) A polarizing plate provided on a surface of a liquid crystal cell of a display, containing a polarizing element, Film A and Film B each provided on each of two surfaces of the polarizing element, wherein the polarizing plate satisfies the following conditions (1) to (4):

Condition (1): Film A and Film B satisfy Formulae (I) and (II), $$0 \leq Wb < Wa \qquad \text{Formula (I):}$$

$$0.1\ (g/m^2) < Wa \leq 3.0\ (g/m^2) \qquad \text{Formula (II):}$$

wherein Wa and Wb each represents a total weight in $g/m^2$ of an ultraviolet absorber and a stabilized contained in 1 $m^2$ of Film A and Film B, respectively;

Condition (2): Film A and Film B satisfy Formulae (III) and (IV)

$$0 \leq Ra < Rb \qquad \text{Formula (III):}$$

$$0.1\ (g/m^2) < Rb \leq 3.0\ (g/m^2) \qquad \text{Formula (IV):}$$

wherein Ra and Rb each represents a weight in $g/m^2$ of a retardation increasing agent contained in 1 $m^2$ of Film A and Film B, respectively;

Condition (3): Film B satisfies the following conditions:
  (a) Ro of Film B defined by Formula (V) is not less than 20 nm and not more than 95 nm; and
  (b) Rth of Film B defined by Formula (VI) is not less than 70 nm and not more than 400 nm,
  Ro and Rth being measured at a wavelength of 590 nm and under a humidity of 55% RH at 23° C., $$Ro = (nx - ny) \times d \qquad \text{Formula (V):}$$

$$Rth = (((nx + ny)/2) - nz) \times d \qquad \text{Formula (VI):}$$

wherein nx represents an in-plane refractive index in a direction of a slow axis, ny represents an in-plane refractive index in a direction of a fast axis, nz represents an out-of-plane refractive index in a thickness direction, and d represents a thickness of Film B; and Condition (4): Film A and Film B are cellulose acetate films.

(2) The polarizing plate of Item 1, wherein an adhesive layer is provided on a surface of Film B by which the polarizing plate is adhered to the liquid crystal cell.

(3) The polarizing plate of Item 1 or Item 2, wherein Films A and B satisfy Formula (VII) and Formula (VIII).

$$0.1\ (g/m^2) < (Wa + Ra) \leq 3.0\ (g/m^2) \qquad \text{Formula (VII):}$$

$$0.1\ (g/m^2) < (Wb + Rb) \leq 3.0\ (g/m^2) \qquad \text{Formula (VIII):}$$

(4) The polarizing plate of any one of Items 1 to 3, wherein at least one of Film A and Film B contains a plasticizer, a concentration of the plasticizer being not less than 0.5% by weight and less than 20% by weight based on the total weight of the film.

(5) The polarizing plate of any one of Items 1 to 4, wherein an acetylation degree of cellulose acetate used in at least one of Films A and B is in the range of 59.0 to 61.5%.

(6) The polarizing plate of any one of Items 1 to 5, wherein the cellulose acetate films contain a benzophenone derivative or a benzotriazole derivative as the ultraviolet absorber.

(7) The polarizing plate of any one of Items 1 to 6, wherein the retardation increasing agent is a compound containing a 1,3,5-triazine ring.

(8) The polarizing plate of any one of Items 1 to 6, wherein the retardation increasing agent is a 1,4-cyclohexane dicarboxylic acid diphenylester derivative.

(9) The polarizing plate of any one of Items 1 to 8, wherein at least one of Film A and Film B is a film which is formed by a flow casting method and a retardation value of the film is controlled by stretching while a residual solvent is present in the film.

(10) The polarizing plate of any one of Items 1 to 9, wherein Film A and Film B are adhered to the polarizing element through a saponification treatment.

(11) The polarizing plate of any one of Items 1 to 10, wherein retardation values of Films A and B are different from each other.

(12) The polarizing plate of any one of Items 1 to 11, wherein Film B satisfies 30 nm $\leq$ Ro $\leq$ 70 nm.

(13) The polarizing plate of any one of Items 1 to 12, wherein Film B satisfies 90 nm $\leq$ Rth $\leq$ 200 nm.

(14) The polarizing plate of any one of Items 1 to 13, wherein the polarizing plate is provided as a roll film type polarizing plate, a transmission axis of the roll film type polarizing plate being substantially parallel to a longitudinal direction of the roll film type polarizing plate and the slow axis of Film B being substantially parallel to a lateral direction of the roll film type polarizing plate.

(15) A liquid crystal display using the polarizing plate of any one of Items 1 to 14.

(16) The liquid crystal display of Item 15, wherein the liquid crystal display is a multi-domain liquid crystal display.

(17) The liquid crystal display of Item 15, wherein the liquid crystal display is a vertically aligned liquid crystal display.

(18) The liquid crystal display of any one of Items 15 to 17 having Polarizing Plate 1 and Polarizing Plate 2,
  wherein:
  (a) Polarizing Plate 1 comprises:
    (i) Film A1;
    (ii) Polarizing Element 1; and
    (iii) Film B1,
    which are stacked in that order, and the Polarizing Plate 2 comprises:
    (iv) Film A2;
    (v) Polarizing Element 2; and
    (vi) Film B2,
    which are stacked in that order;
  (b) Polarizing Plate 1, a liquid crystal cell and Polarizing Plate 2 are stacked in that order,
    wherein:
    (vii) Film B1 being placed adjacent to one surface of the liquid crystal cell; and
    (viii) Film B2 being placed adjacent to the other surface of the liquid crystal cell;
  (c) a transmission axis of Polarizing Plate 1 is orthogonal to a transmission axis of Polarizing Plate 2;
  (d) Film B1 and Film B2 are essentially the same; and
  (e) a slow axis of each of Film B1 and Film B2 is almost parallel to a transmission axis of adjacent polarizing element.

(19) The liquid crystal display of any one of Items 15 to 18, wherein a moving picture with color images is displayed.

The present invention will be described in further detail, however, the present invention is not limited thereto.

In a film used in the present invention, a plasticizer, an ultraviolet absorber, an stabilizer and a retardation increasing agent may be used within the prescribed limitations in the present invention.

When a polarizing plate of the present invention is used for a display cell, specifically for a liquid crystal cell, in order to maintain the quality of the polarizing element and the display cell, the necessary amount of an ultraviolet absorber and a stabilizer contained in 1 m² of Film A (Wa) is more than 0.1 g/m² and not more than 3.0 g/m². The more preferable Wa value is more than 0.2 g/m² but not more than 2.5 g/m². When Wa is not more than 0.1 g/m², the desired durability which is one of the objective of the present invention may not be attained, and when Wa is more than 3.0 g/m², the transparency of the film may be reduced.

In the polarizing plate of the present invention, the Wa and Wb values (Wb being the total amount of ultraviolet absorber and stabilizer contained in 1 m² of Film B) preferably satisfy Wa>Wb≧0 and, more preferably, satisfy Wa>Wb=0.

When containing a larger amount of an ultraviolet absorber and a stabilizer in Film A than in Film B, the polarizing plate of the present invention effectively protects the liquid crystal element and also prevents degradation of the display cell, resulting in reducing a production cost of the display. The amount of ultraviolet absorber and stabilizer contained in Film B may be appropriately adjusted in the range prescribed in the present invention to keep the quality of the display cell.

When a polarizing plate of the present invention is used for a display cell, specifically for a liquid crystal cell, in order to improve the quality of the display image, the retardation value of Film B may be appropriately adjusted. For this purpose, it is necessary to add a retardation increasing agent, which will be described later, to a protecting film of a polarizing element to optimize the retardation value.

In the present invention, the amount of retardation increasing agent contained in 1 m² of Films A and B is represented by Ra and Rb (g/m²), respectively. In order to attain an object of the present invention, the Rb value is preferably more than 0.1 g/m² and not more than 3.0 g/m², and more preferably more than 0.2 g/m² and not more than 2.5 g/m².

When the Rb value is not more than 0.1 g/m², a sufficient retardation effect to attain an improved image quality may not be obtained, and when the Rb is more than 3.0 g/m², the transparency of the film may be reduced.

In a polarizing plate of the present invention, the Ra and Rb values preferably satisfy 0≦Ra<Rb and, more preferably, satisfy 0=Ra<Rb, in order to utilize the retardation increasing agent effectively to improve image quality of the display of the present invention.

A polarizing plate of the present invention may be used on at least one observation surface of a display. In a conventional liquid crystal display, a polarizing plate of the present invention may be used alternatively to a polarizing plate known in the prior art to effectively attain an object of the present invention.

The Wa, Wb, Ra and Rb values of Films A and B of the present invention preferably satisfy 0.1 (g/m²)<(Wa+Ra)≦ 3.0 (g/m²) and 0.1 (g/m²)<(Wb+Rb)≦3.0 (g/m²). When both the (Wa+Ra) and (Wb+Rb) values are not more than 0.1 g/m², desired improvement of image quality of the display may not be attained, and when both the (Wa+Ra) and (Wb+Rb) values are more than 3.0 g/m², the durability of the polarizing plate against high temperature or high humidity may be lost, which is undesirable with respect to a production cost since rather expensive additives are incorporated in the film.

A preparation method of a cellulose ester film used for the polarizing plate, specifically, a preparation method including a flow casting process and a subsequent in-line stretching process to form an optically biaxial polymer film will be described below.

A cellulose ester film of the present invention is produced by the following steps: (i) flow casting a dope prepared by dissolving cellulose ester in a solvent on a support (a stainless steel belt) to form a film; (ii) peeling the film from the support; (iii) stretching the film in the lateral direction by applying tension while the film contains residual solvent; and (iv) drying the film by conveying the film through a drying zone. This method is preferable in that a uniform retardation value over the entire film is easily obtained, which may also result in reducing uneven coloring in a display.

A film forming method via a flow casting procedure of the present invention will now be described. Herein, the machine direction (MD) represents the film conveying direction (being the longitudinal direction of the film) and the transverse direction (TD) represents the direction perpendicular to the machine direction (being the lateral direction of the film).

(1) Dissolution process: Cellulose ester (flakes, powder, or grains, but preferably a powder, with a mean particle diameter of more than 100 µm) is dissolved in an organic solvent which mainly contains good solvent, in a vessel while stirring a mixture of a cellulose ester, an additive and a solvent. A dope is thus prepared. The dissolving process may be carried out under the following various conditions: (i) at the ambient temperature under the ambient pressure; (ii) at a temperature below the boiling point of good solvent; (iii) at a temperature higher than the boiling point of good solvent under a higher pressure; (iv) in a cooled solvent; or (v) under a considerably high pressure. After dissolving cellulose ester, the dope is filtered using a filter element and defoamed followed by being pumpt to the next process. "A good solvent" represents an organic solvent which well dissolves a cellulose ester, as will be described later.

The above mentioned dope represents a solution prepared by dissolving cellulose ester and additives, to be explained later, in an organic solvent.

Raw materials for a cellulose ester used in the present invention are not specifically limited, however, for example, cotton linter, wood pulp, and kenaf are included. These materials may also be used in combinations at an appropriate mixing ratio.

When an acid anhydride (acetic anhydride) is used as an acylation agent of cellulose to form cellulose ester of the present invention, an acylation reaction is carried out using a protic catalyst, for example, sulfuric acid, in an organic acid such as acetic acid or in an organic solvent such as methylene chloride.

When an acylation agent is acetyl chloride ($CH_3COCl$), a reaction is carried out using a basic compound such as an amine as a catalyst. Specifically, the reaction disclosed in JP-A No. 10-45804 is preferable.

In an acylation reaction to form a cellulose ester, an acyl group reacts with the hydroxyl group of a cellulose molecule. A cellulose molecule is made up of many glucose units connected each other, and a glucose unit contains three hydroxyl groups. The number of hydroxyl groups substituted by acyl groups in a glucose unit is referred to as a degree of acetyl substitution. For example, in the case of cellulose acetate, when all the three hydroxyl groups in one glucose unit are substituted by acetyl groups, the degree of acetyl substitution is defined as 3.0.

The degree of acetyl substitution of acyl groups may be measured using the method according to ASTM-D817-96.

The number average molecular weight of the a cellulose ester used in the present invention is preferably in the range of 60,000 to 300,000 with respect to the strength of the cellulose ester film. More preferably, a cellulose ester having the number average molecular weight of 70,000 to 200,000 is used.

The number average molecular weight of a cellulose ester can be measured by means of a high-performance liquid chromatography under the following condition.

| | |
|---|---|
| Solvent: | Acetone |
| Column: | MPW × 1 |
| | (produced by Tosoh Corp.) |
| Sample concentration: | 0.2 (mass/capacity) % |
| Flow rate: | 1.0 ml/minute |
| Specimen injection: | 300 µl |
| Standard sample: | Polymethyl methacrylate |
| Temperature: | 23° C. |

Cellulose acetate exhibiting an acetylation degree of 59.0 to 61.5% is preferably used.

The acetylation degree represents the amount of bonded acetic acid per unit weight of cellulose, the measurement of which is carried out based on ASTM-D817-91.

When a cellulose ester film does not show required optical properties, film forming conditions, for example, thickness, temperature, stretch factor, amount of retardation increasing agent, may be adjusted.

(Retardation Increasing Agent)

An aromatic compound which has two or more aromatic rings, for example, disclosed in EP No. 911,656A2 may be used for adjusting the retardation value of a film.

Two or more kinds of aromatic compounds may be used in combination. The aromatic ring of the aromatic compound include an aromatic hydrocarbon ring and an aromatic heterocyclic ring. An aromatic heterocyclic ring is specifically preferable. An aromatic heterocyclic ring is generally an unsaturated heterocyclic ring. Among aromatic heterocyclic rings, a 1,3,5-triazine ring is specifically preferable.

The number of aromatic rings contained in an aromatic compound is preferably 2 to 20, more preferably 2 to 12, specifically more preferably 2 to 8, and most preferably 3 to 6. The bonding relationship of two aromatic rings may be classified into: (a) a case when two aromatic rings are bonded to form a condensed ring; (b) a case when two aromatic rings are directly bonded by a single bond; and (c) a case when two aromatic rings are bonded through a linking group (a spiro bond cannot be formed since these are aromatic rings). The bonding relationship may be any one of (a) to (c).

Examples of a condensed ring (a) include: an indene ring, a naphthalene ring, an azulene ring, a fluorene ring, a phenanthrene ring, an anthracene ring, an acenaphtylene ring, a naphthacene ring, a pyrene ring, an indole ring, an isoindole ring, a benzofuran ring, a benzothiophene ring, an indolizine ring, a benzoxazole ring, a benzothiazole ring, a benzimidazole ring, a benzotriazole ring, a purine ring, an indazole ring, a chromene ring, a quinoline ring, an isoquinoline ring, a quinolizine ring, a quinazoline ring, a cinnoline ring, a quinoxaline ring, a phthalazine ring, a pteridine ring, a carbazole ring, an acridine ring, a phenanthridine ring, a xanthene ring, a phenazine ring, a phenothiazine ring, a phenoxathiin ring, a phenoxazine ring, and a thianthrene ring. Among these, a naphthalene ring, an azulene ring, an indole ring, a benzoxazole ring, a benzothiazole ring, a benzimidazole ring, a benzotriazole ring, and a quinoline ring.

A single bond of (b) is preferably a bond between two carbon atoms of the two aromatic rings. Two aromatic rings may be combined by two or more single bonds to form an aliphatic ring or a non-aromatic heterocyclic ring between two aromatic rings.

A bond via a linking group of (c) is preferably a bond between two carbon atoms of the two aromatic rings. Preferable linking groups are an alkylene group, an alkenylene group, an alkynylene group, —CO—, —O—, —NH—, —S—, or those combinations. Examples of the linking group consisting of a combination are shown below. The order of the following combination of linking groups may be left-right reverse.

—CO—O—, —CO—NH—, -alkylene-O—, —NH—CO—NH—, —NH—CO—O—, —O—CO—O—, —O-alkylene-O—, —CO-alkenylene-, —CO-alkenylene-NH—, —CO-alkenylene-O—, -alkylene-CO—O-alkylene-O—CO-alkylene-, —O-alkylene-CO—O-alkylene-O—CO-alkylene-O—, —O—CO-alkylene-CO—O—, —NH—CO-alkenylene-, —O—CO-alkenylene-.

The aromatic ring and the linking group may have a substituent. Example of a substituent include: a halogen atom (F, Cl, Br, I), a hydroxyl group, a carboxyl group, a cyano group, an amino group, a nitro group, a sulfo group, a carbamoyl group, a sulfamoyl group, a ureido group, an alkyl group, an alkenyl group, an alkynyl group, a aliphatic acyl group, a aliphatic acyloxy group, an alkoxy group, an alkoxy carbonyl group, an alkoxy carbonyl amino group, an alkylthio group, an alkylsulfonyl group, a aliphatic amide group, a aliphatic sulfonamide group, an aliphatic alkyl substituted amino group, an aliphatic alkyl substituted carbamoyl group, an aliphatic alkyl substituted sulfamoyl group, an aliphatic alkyl substituted ureido group, and a non-aromatic heterocyclic group.

The number of carbon atoms contained in an alkyl group is preferably 1 to 8. A chain alkyl group is more preferable than a cyclic alkyl group and a linear-chain alkyl group is specifically more preferable. An alkyl group may have a substituent (for example, a hydroxy group, a carboxy group, an alkoxy group, an alkylated amino group). Examples of an alkyl group (containing a substituted alkyl group) include: a methyl group, an ethyl group, a n-butyl group, a n-hexyl group, a 2-hydroxyethyl group, a 4-carboxybutyl group, a 2-methoxyethyl group and a 2-diethylaminoethyl group. The number of carbon atoms contained in an alkenyl group is preferably 2 to 8. A chain alkenyl group is more preferable than a cyclic alkenyl group and a linear-chain alkenyl group is specifically more preferable. An alkenyl group may further have a substituent. Examples of an alkenyl group include: a vinyl group, an allyl group and a 1-hexenyl group. The number of carbon atoms contained in an alkynyl group is preferably 2 to 8. A chain alkynyl group is more preferable than a cyclic alkynyl group and a linear-chain alkynyl group is specifically more preferable. An alkynyl group may have a substituent. Examples of an alkynyl group include: an ethynyl group, a 1-butyny group and a 1-hexynyl group.

The number of carbon atoms contained in an aliphatic acyl group is preferably 1 to 10. Examples of an aliphatic acyl group include: an acetyl group, a propanoyl group and a butanoyl group. The number of carbon atoms contained in a aliphatic acyloxy group is preferably 1 to 10. As an example of a aliphatic acyloxy group, an acetoxy group is named. The number of carbon atoms contained in aa alkoxy group is preferably 1 to 8. An alkoxy group may have a substituent. Examples of an alkoxy group (containing a substituted alkoxy group) include: a methoxy group, an ethoxy group, a butoxy group, and a methoxyethoxy group. The number of carbon atoms contained in an alkoxycarbonyl group is preferably 2 to 10. Examples of a alkoxycarbonyl group include: a methoxycarbonyl group and an ethoxycarbonyl group. The number of carbon atoms contained in an alkoxycarbonylamino group is preferably 2 to 10. Examples of an alkoxycarbonylamino group include: an methoxycarbonylamino group and an ethoxycarbonyl amino group.

The number of carbon atoms contained in an alkylthio group is preferably 1 to 12. Examples of an alkylthio group include: a methylthio group, an ethylthio group, and octylthio group. The number of carbon atoms contained in an alkylsulfonyl group is preferably 1 to 8. Examples of an alkylsulfonyl group include: a methanesulfonyl group and an ethanesulfonyl group. The number of carbon atoms contained in a aliphatic amide group is preferably 1 to 10. As an example of a aliphatic amide group, an acetamide group is named. The number of carbon atoms contained in a aliphatic sulfonamide group is preferably 1 to 8. Examples of a aliphatic sulfonamide group include: a methane sulfonamides group, a butane sulfonamide group and a n-octanesulfonamide group. The number of carbon atoms contained in an aliphatic alkyl substituted amino group is preferably 1 to 10. Examples of an aliphatic alkyl substituted amino group include: a dimethylamino group, a diethylamino group, and a 2-carboxyethylamino group. The number of carbon atoms contained in an aliphatic alkyl substituted carbamoyl group is preferably 2 to 10. Examples of an aliphatic alkyl substituted carbamoyl group include: a methylcarbamoyl group and a diethylcarbamoyl group. The number of carbon atoms contained in an aliphatic alkyl substituted sulfamoyl group is preferably 1 to 8. Examples of an aliphatic alkyl substituted sulfamoyl group include, for example: a methylsulfamoyl group and a diethylsulfamoyl group. The number of carbon atoms in an aliphatic alkyl substituted ureido group is preferably 2 to 10. As an example of an aliphatic alkyl substituted ureido group, for example, a methylureido is listed. Examples of a non-aromatic heterocyclic group include: a piperidino group and a morpholino group.

The molecular weight of a retardation increasing agent is preferably not less than 300 and not more than 800. In this range of molecular weight, solving out of the retardation agent while the film is being used or in a production process of a polarizing plate is suppressed and a polarity of a molecule is arbitrarily selected.

Among the compounds having a 1,3,5-triazine ring, compounds represented by Formula (A) are preferably used.

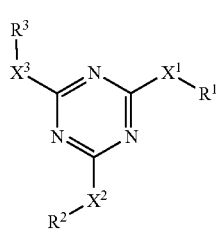

Formula (A)

wherein (i) $X^1$ represents a single bond, for example, —NR4—, —O—, or —S—; (ii) $X^2$ represents a single bond, for example, —NR5—, —O—, or —S—; (iii) $X^3$ represents a single bond, for example, —NR6—, —O—, or —S—; (iv) $R^1$, $R^2$, and $R^3$ each represents, for example, an alkyl group, an alkenyl group, an aryl group, or a heterocyclic group; and (v) $R^4$, $R^5$ and $R^6$ each represents a hydrogen atom, an alkyl group, an alkenyl group, an aryl group, or a heterocyclic group.

A melamine compound is specifically preferable among the compounds represented by Formula (A).

In a melamine compound represented by Formula (A): (i) $X^1$, $X^2$, and $X^3$ represent —NR4—, —NR5—, and —NR6—, respectively; or (ii) $X^1$, $X^2$, and $X^3$ each represents a single bond, and $R^1$, $R^2$, and $R^3$ each represents a heterocyclic group having a free valence on nitrogen atoms. —X1-R1, —X2-R2, and —X3-R3 are preferably the same substituents. R1, R2, and R3 are specifically preferably aryl groups. R4, R5, and R6 are specifically preferably hydrogen atoms.

As the above alkyl group, a chain alkyl-group is more preferable than a cyclic alkyl group and a linear-chain alkyl group is more preferable than a branched chain alkyl group.

The number of carbon atoms in an alkyl group is preferably 1 to 30, more preferably 1 to 20, further more preferably 1 to 10, specifically more preferably 1 to 8 and the most preferably 1 to 6. An alkyl group may have a substituent.

Examples of a substituent include: a halogen atom, an alkoxy group (for example, a methoxy group, an ethoxy group, and epoxyethyloxy group), an acyloxy group (for example, an acryloyloxy group and a methacryloyloxy group). As the above alkenyl group, a chain alkenyl group is more preferable than a cyclic alkenyl group and a linear-chain alkenyl group is more preferable than a branched chain alkenyl group. The number of carbon atoms in an alkenyl group is preferably 2 to 30, more preferably 2 to 20, further more preferably 2 to 10, specifically more preferably 2 to 8 and the most preferably 2 to 6. An alkenyl group may have a substituent.

Examples of a substituent include: a halogen atom, an alkoxy group (for example, a methoxy group and an ethoxy group, and an epoxyethyloxy group) and an acyloxy group (for example, an acryloyloxy group and a methacryloyloxy group).

As the above aryl group, a phenyl group or a naphthyl group is preferable, and a phenyl group is specifically preferable. An aryl group may have a substituent.

Examples of a substituent include: a halogen atom, a hydroxyl group, a cyano group, a nitro group, a carboxyl group, an alkyl group, an alkenyl group, an aryl group, an alkoxy group, an alkenyloxy group, an aryloxy group, an acyloxy group, an alkoxycarbonyl group, an alkenyloxycarbonyl group, an aryloxycarbonyl group, a sulfamoyl group, an alkyl substituted sulfamoyl group, an alkenyl substituted sulfamoyl group, an aryl substituted sulfamoyl group, a sulfonamides group, a carbamoyl group, an alkyl substituted carbamoyl group, an alkenyl substituted carbamoyl group, an aryl substituted carbamoyl group, an amide group, an alkylthio group, an alkenylthio group, an arylthio group, and an acyl group. The alkyl groups described here are common to the aforementioned alkyl groups.

The alkyl portions of the alkoxy group, the acyloxy group, the alkoxycarbonyl group, the alkyl substitute sulfamoyl group, the sulfonamide group, the alkyl substituted carbamoyl group, the amide group, the alkylthio group, and the acyl group described here are common to the aforementioned alkyl groups.

The alkenyl groups described here are common to the aforementioned alkenyl groups.

The alkenyl portions of an alkenyloxy group, an acyloxy group, an alkenyloxycarbonyl group, an alkenyl substituted sulfamoyl group, a sulfonamide group, an alkenyl substituted carbamoyl group, an amide group, an alkenylthio group, and an acyl group represents the same alkenyl groups as those previously mentioned.

Examples of the above aryl group include: a phenyl group, an α-naphthyl group, a β-naphthyl group, a 4-methoxyphenyl group, a 3,4-diethoxyphenyl group, a 4-octyloxyphenyl group, and a 4-dodecyloxyphenyl group.

The examples of aryl portions of an aryloxy group, an acyloxy group, an aryloxycarbonyl group, an aryl substituted sulfamoyl group, a sulfonamide group, an aryl substituted carbamoyl group, an amide group, an arylthio group, and an acyl group are common to the aforementioned examples.

When $X^1$, $X^2$, or $X^3$ are —NR—, —O—, or —S—, respectively, a heterocyclic group preferably has aromaticity.

The heterocyclic ring contained in an aromatic heterocyclic group is generally a unsaturated heterocyclic ring and preferably has the maximum number of double bonds. The heterocyclic ring is preferably a 5 membered ring, a 6 membered ring, or a 7 membered ring, more preferably a 5 membered ring, or a 6 membered ring, and the most preferably a 6 membered ring.

The hetero atom in a heterocyclic ring is preferably a N atom, a S atom, or an O atom, and specifically preferably a N atom.

As an aromatic heterocyclic ring, a pyridine ring (examples of a heterocyclic group include: a 2-pyridyl group or a 4-pyridyl group) is specifically preferable. A heterocyclic group may have a substituent.

The examples described for the substituents of the aryl portions are also common for the substituents of the heterocyclic groups.

When $X^1$, $X^2$, or $X^3$ are single bonds, a heterocyclic group preferably has a free valence on a N atom. A heterocyclic group which has a free valence on a N atom is preferably a 5 membered ring, a 6 membered ring, or a 7 membered ring, more preferably a 5 membered ring, or a 6 membered ring, and the most preferably a 5 membered ring. A heterocyclic group may have a plurality of N atoms.

A hetero atom contained in a heterocyclic group may be a hetero atom other than a nitrogen atom (for example, an O atom or a S atom). A heterocyclic group may have a substituent. The examples described for the substituents of the aryl portions are also common to the substituents of the heterocyclic groups.

Examples of a heterocyclic group having a free valence on a N atom will be shown below.

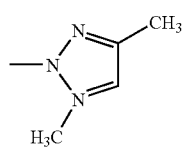

(Hc-1)

-continued

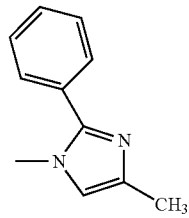

(Hc-2)

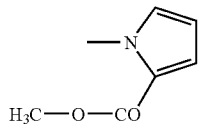

(Hc-3)

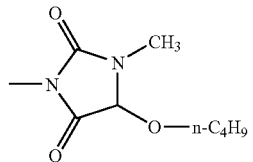

(Hc-4)

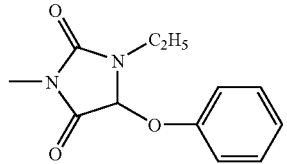

(Hc-5)

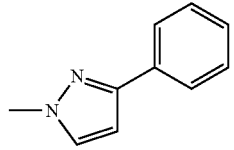

(Hc-6)

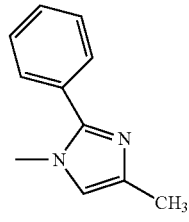

(Hc-7)

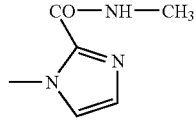

(Hc-8)

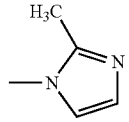

(Hc-9)

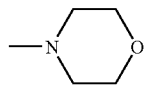

(Hc-10)

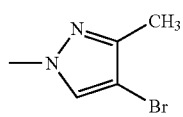

(hc-11)

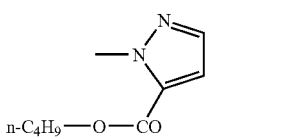

(Hc-12)

Examples of a compound having a 1,3,5-triazine ring will be shown below.

In the following, a plurality of R represent the same groups.

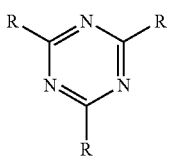

(1)–(12)

(1) butyl
(2) 2-methoxy-2-ethoxyethyl
(3) 5-undecenyl
(4) phenyl
(5) 4-ethoxycarbonylphenyl
(6) 4-butoxyphenyl
(7) p-biphenylyl
(8) 4-pyridyl
(9) 2-naphthyl
(10) 2-methylphenyl
(11) 3,4-dimethoxyphenyl
(12) 2-furyl

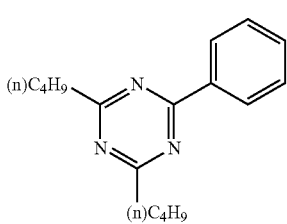

(13)

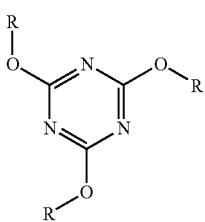

(14)–(79)

(14) phenyl
(15) 3-ethoxycarbonylphenyl
(16) 3-butoxyphenyl
(17) m-biphenylyl
(18) 3-phenylthiophenyl
(19) 3-chlorophenyl
(20) 3-benzoylphenyl
(21) 3-acetoxyphenyl
(22) 3-benzoyloxyphenyl
(23) 3-phenoxycarbonylphenyl
(24) 3-methoxyphenyl
(25) 3-anilinophenyl
(26) 3-isobutyrylaminophenyl
(27) 3-phenoxycarbonylaminophenyl
(28) 3-(3-ethylureido)phenyl
(29) 3-(3,3-diethylureido)phenyl
(30) 3-methylphenyl
(31) 3-phenoxyphenyl
(32) 3-hydroxyphenyl
(33) 4-ethoxycarbonylphenyl
(34) 4-butoxyphenyl
(35) p-biphenylyl
(36) 4-phenylthiophenyl
(37) 4-chlorophenyl
(38) 4-benzoylphenyl
(39) 4-acetoxyphenyl
(40) 4-benzoyloxyphenyl
(41) 4-phenoxycarbonylphenyl
(42) 4-methoxyphenyl
(43) 4-anilinophenyl
(44) 4-isobutyrylaminophenyl
(45) 4-phenoxycarbonylaminophenyl
(46) 4-(3-ethylureido)phenyl
(47) 4-(3,3-diethylureido)phenyl
(48) 4-methylphenyl
(49) 4-phenoxyphenyl
(50) 4-hydroxyphenyl
(51) 3,4-diethoxycarbonylphenyl
(52) 3,4-dibutoxyphenyl
(53) 3,4-diphenylphenyl
(54) 3,4-diphenylthiophenyl
(55) 3,4-dichlorophenyl
(56) 3,4-dibenzoylphenyl
(57) 3,4-diacetoxyphenyl
(58) 3,4-dibenzoyloxyphenyl
(59) 3,4-diphenoxycarbonylphenyl
(60) 3,4-dimethoxyphenyl
(61) 3,4-dianilinophenyl
(62) 3,4-dimethylphenyl
(63) 3,4-diphenoxyphenyl
(64) 3,4-dihydroxyphenyl
(65) 2-naphthyl
(66) 3,4,5-triethoxycarbonylphenyl
(67) 3,4,5-tributoxyphenyl
(68) 3,4,5-triphenylphenyl
(69) 3,4,5-triphenylthiophenyl
(70) 3,4,5-trichlorophenyl
(71) 3,4,5-tribenzoylphenyl
(72) 3,4,5-triacetoxyphenyl
(73) 3,4,5-tribenzoyloxyphenyl
(74) 3,4,5-triphenoxycarbonylphenyl
(75) 3,4,5-trimethoxyphenyl
(76) 3,4,5-trianilinophenyl
(77) 3,4,5-trimethylphenyl
(78) 3,4,5-triphenoxyphenyl
(79) 3,4,5-trihydroxyphenyl

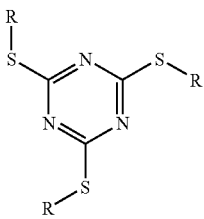

(80)–(145)

(80) phenyl
(81) 3-ethoxycarbonylphenyl
(82) 3-butoxyphenyl
(83) m-biphenylyl
(84) 3-phenylthiophenyl
(85) 3-chlorophenyl
(86) 3-benzoylphenyl
(87) 3-acetoxyphenyl
(88) 3-benzoyloxyphenyl
(89) 3-phenoxycarbonylphenyl
(90) 3-methoxyphenyl
(91) 3-anilinophenyl
(92) 3-isobutyrylaminophenyl
(93) 3-phenoxycarbonylaminophenyl
(94) 3-(3-ethylureido)phenyl
(95) 3-(3,3-diethylureido)phenyl
(96) 3-methylphenyl
(97) 3-phenoxyphenyl
(98) 3 Hydroxyphenyl
(99) 4-ethoxycarbonylphenyl
(100) 4-butoxyphenyl
(101) p-biphenylyl
(102) 4-phenylthiophenyl
(103) 4-chlorophenyl
(104) 4-benzoylphenyl
(105) 4-acetoxyphenyl
(106) 4-benzoyloxyphenyl
(107) 4-phenoxycarbonylphenyl
(108) 4-methoxyphenyl
(109) 4-anilinophenyl
(110) 4-isobutyrylaminophenyl
(111) 4-phenoxycarbonylaminophenyl
(112) 4-(3-ethylureido)phenyl
(113) 4-(3,3-diethylureido)phenyl
(114) 4-methylphenyl
(115) 4-phenoxyphenyl
(116) 4-hydroxyphenyl
(117) 3,4-diethoxycarbonylphenyl
(118) 3,4-dibutoxyphenyl
(119) 3,4-diphenylphenyl
(120) 3,4-diphenylthiophenyl
(121) 3,4-dichlorophenyl
(122) 3,4-dibenzoylphenyl
(123) 3,4-diacetoxyphenyl
(124) 3,4-dibenzoyloxyphenyl
(125) 3,4-diphenoxycarbonylphenyl
(126) 3,4-dimethoxyphenyl
(127) 3,4-dianilinophenyl
(128) 3,4-dimethylphenyl
(129) 3,4-diphenoxyphenyl
(130) 3,4-dihydroxyphenyl
(131) 2-naphthyl
(132) 3,4,5-triethoxycarbonylphenyl
(133) 3,4,5-tributoxyphenyl
(134) 3,4,5-triphenylphenyl
(135) 3,4,5-triphenylthiophenyl
(136) 3,4,5-trichlorophenyl
(137) 3,4,5-tribenzoylphenyl
(138) 3,4,5-triacetoxyphenyl
(139) 3,4,5-tribenzoyloxyphenyl
(140) 3,4,5-triphenoxycarbonylphenyl
(141) 3,4,5-trimethoxyphenyl
(142) 3,4,5-trianilinophenyl
(143) 3,4,5-trimethylphenyl
(144) 3,4,5-triphenoxyphenyl
(145) 3,4,5-trihydroxyphenyl (146)–(164)

(146) phenyl
(147) 4-ethoxycarbonylphenyl
(148) 4-butoxyphenyl
(149) p-biphenylyl
(150) 4-phenylthiophenyl
(151) 4-chlorophenyl
(152) 4-benzoylphenyl
(153) 4-acetoxyphenyl
(154) 4-benzoyloxyphenyl
(155) 4-phenoxycarbonylphenyl
(156) 4-methoxyphenyl
(157) 4-anilinophenyl
(158) 4-isobutyrylaminophenyl
(159) 4-phenoxycarbonylaminophenyl
(160) 4-(3-ethylureido)phenyl
(161) 4-(3,3-diethylureido)phenyl
(162) 4-methylphenyl
(163) 4-phenoxyphenyl
(164) 4-hydroxyphenyl (165)–(183)

(165) phenyl
(166) 4-ethoxycarbonylphenyl
(167) 4-butoxyphenyl
(168) p-biphenylyl
(169) 4-phenylthiophenyl
(170) 4-chlorophenyl
(171) 4-benzoylphenyl
(172) 4-acetoxyphenyl
(173) 4-benzoyloxyphenyl
(174) 4-phenoxycarbonylphenyl
(175) 4-methoxyphenyl (176) 4-anilinophenyl
(177) 4-isobutyrylaminophenyl
(178) 4-phenoxycarbonylaminophenyl
(179) 4-(3-ethylureido)phenyl
(180) 4-(3,3-diethylureido)phenyl
(181) 4-methylphenyl
(182) 4-phenoxyphenyl
(183) 4-hydroxyphenyl

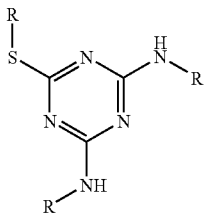

(184)–(202)

(184) Phenyl
(185) 4-ethoxycarbonylphenyl
(186) 4-butoxyphenyl
(187) p-biphenylyl
(188) 4-phenylthiophenyl
(189) 4-chlorophenyl
(190) 4-benzoylphenyl
(191) 4-acetoxyphenyl
(192) 4-benzoyloxyphenyl
(193) 4-phenoxycarbonylphenyl
(194) 4-methoxyphenyl
(195) 4-anilinophenyl
(196) 4-isobutyrylaminophenyl
(197) 4-phenoxycarbonylaminophenyl
(198) 4-(3-ethylureido)phenyl
(199) 4-(3,3-diethylureido)phenyl
(200) 4-methylphenyl
(201) 4-phenoxyphenyl
(202) 4-hydroxyphenyl

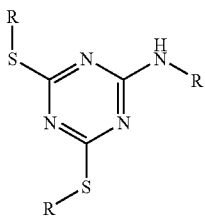

(203)–(221)

(203) phenyl
(204) 4-ethoxycarbonylphenyl
(205) 4-butoxyphenyl
(206) p-biphenylyl
(207) 4-phenylthiophenyl
(208) 4-chlorophenyl
(209) 4-benzoylphenyl
(210) 4-acetoxyphenyl
(211) 4-benzoyloxy-i-phenyl
(212) 4-phenoxycarbonylphenyl
(213) 4-methoxyphenyl
(214) 4-anilinophenyl
(215) 4-isobutyrylaminophenyl
(216) 4-phenoxycarbonylaminophenyl
(217) 4-(3-ethylureido)phenyl
(218) 4-(3,3-diethylureido)phenyl
(219) 4-methylphenyl
(220) 4-phenoxyphenyl
(221) 4-hydroxyphenyl

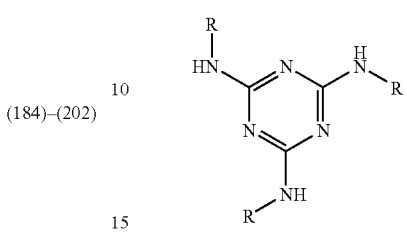

(222)–(419)

(222) phenyl
(223) 4-butylphenyl
(224) 4-(2-methoxy-2-ethoxyethyl)phenyl
(225) 4-(5-nonenyl)phenyl
(226) p-biphenylyl
(227) 4-ethoxycarbonylphenyl
(228) 4-butoxyphenyl
(229) 4-methylphenyl
(230) 4-chlorophenyl
(231) 4-phenylthiophenyl
(232) 4-benzoylphenyl
(233) 4-acetoxyphenyl
(234) 4-benzoyloxyphenyl
(235) 4-phenoxycarbonylphenyl
(236) 4-methoxyphenyl
(237) 4-anilinophenyl
(238) 4-isobutyrylaminophenyl
(239) 4-phenoxycarbonylaminophenyl
(240) 4-(3-ethylureido)phenyl
(241) 4-(3,3-diethylureido)phenyl
(242) 4-phenoxyphenyl
(243) 4-hydroxyphenyl
(244) 3-butylphenyl
(245) 3-(2-methoxy-2-ethoxyethyl)phenyl
(246) 3-(5-nonenyl)phenyl
(247) m-biphenylyl
(248) 3-ethoxycarbonylphenyl
(249) 3-butoxyphenyl
(250) 3-methylphenyl
(251) 3-chlorophenyl
(252) 3-phenylthiophenyl
(253) 3-benzoylphenyl
(254) 3-acetoxyphenyl
(255) 3-benzoyloxiphenyl
(256) 3-phenoxycarbonylphenyl
(257) 3-methoxyphenyl
(258) 3-anilinophenyl
(259) 3-isobutyrylaminophenyl
(260) 3-phenoxycarbonylaminophenyl
(261) 3-(3-ethylureido)phenyl
(262) 3-(3,3-diethylureido)phenyl
(263) 3-phenoxyphenyl
(264) 3 Hydroxyphenyl
(265) 2-butylphenyl
(266) 2-(2-methoxy-2-ethoxyethyl)phenyl
(267) 2-(5-nonenyl)phenyl
(268) o-biphenylyl
(269) 2-ethoxycarbonylphenyl
(270) 2-butoxyphenyl
(271) 2-methylphenyl (272) 2-chlorophenyl
(273) 2-phenylthiophenyl
(274) 2-benzoylphenyl
(275) 2-acetoxyphenyl
(276) 2-benzoyloxyphenyl
(277) 2-phenoxycarbonylphenyl
(278) 2-methoxyphenyl
(279) 2-anilinophenyl
(280) 2-isobutyrylaminophenyl
(281) 2-phenoxycarbonylaminophenyl
(282) 2-(3-ethylureido)phenyl
(283) 2-(3,3-diethylureido)phenyl
(284) 2-phenoxyphenyl
(285) 2 Hydroxyphenyl
(286) 3,4-dibutylphenyl
(287) 3,4-di(2-methoxy-2-ethoxyethyl)phenyl
(288) 3,4-diphenylphenyl
(289) 3,4-diethoxycarbonylphenyl
(290) 3,4-didodecyloxyphenyl
(291) 3,4-dimethylphenyl
(292) 3,4-dichlorophenyl
(293) 3,4-dibenzoylphenyl
(294) 3,4-diacetoxyphenyl
(295) 3,4-dimethoxyphenyl
(296) 3,4-di-N-methylaminophenyl
(297) 3,4-diisobutyrylaminophenyl
(298) 3,4-diphenoxyphenyl
(299) 3,4-dihydroxyphenyl
(300) 3,5-dibutylphenyl
(301) 3,5-di(2-methoxy-2-ethoxyethyl)phenyl
(302) 3,5-diphenylphenyl
(303) 3,5-diethoxycarbonylphenyl
(304) 3,5-didodecyloxyphenyl
(305) 3,5-dimethylphenyl
(306) 3,5-dichlorophenyl
(307) 3,5-dibenzoylphenyl
(308) 3,5-diacetoxyphenyl
(309) 3,5-dimethoxyphenyl
(310) 3,5-di-N-methylaminophenyl
(311) 3,5-diisobutyrylaminophenyl
(312) 3,5-diphenoxyphenyl
(313) 3,5-dihydroxyphenyl
(314) 2,4-dibutylphenyl
(315) 2,4-di(2-methoxy-2-ethoxyethyl)phenyl
(316) 2,4-diphenylphenyl
(317) 2,4-diethoxycarbonylphenyl
(318) 2,4-didodecyloxyphenyl
(319) 2,4-dimethylphenyl
(320) 2,4-dichlorophenyl
(321) 2,4-dibenzoylphenyl
(322) 2,4-diacetoxyphenyl
(323) 2,4-dimethoxyphenyl
(324) 2,4-di-N-methylaminophenyl
(325) 2,4-diisobutyrylaminophenyl
(326) 2,4-diphenoxyphenyl
(327) 2,4-dihydroxyphenyl
(328) 2,3-dibutylphenyl
(329) 2,3-di(2-methoxy-2-ethoxyethyl)phenyl
(330) 2,3-diphenylphenyl
(331) 2,3-diethoxycarbonylphenyl
(332) 2,3-didodecyloxyphenyl
(333) 2,3-dimethylphenyl
(334) 2,3-dichlorophenyl
(335) 2,3-dibenzoylphenyl
(336) 2,3-diacetoxyphenyl
(337) 2,3-dimethoxyphenyl
(338) 2,3-di-N-methylaminophenyl
(339) 2,3-diisobutyrylaminophenyl
(340) 2,3-diphenoxyphenyl
(341) 2,3-dihydroxy phenyl
(342) 2,6-dibutylphenyl
(343) 2,6-di(2-methoxy-2-ethoxyethyl)phenyl
(344) 2,6-diphenylphenyl
(345) 2,6-diethoxycarbonylphenyl
(346) 2,6-didodecyloxyphenyl
(347) 2,6-dimethylphenyl
(348) 2,6-dichlorophenyl
(349) 2,6-dibenzoylphenyl
(350) 2,6-diacetoxyphenyl
(351) 2,6-dimethoxyphenyl
(352) 2,6-di-N-methylaminophenyl
(353) 2,6-diisobutyrylaminophenyl
(354) 2,6-diphenoxyphenyl
(355) 2,6-dihydroxyphenyl
(356) 3,4,5-tributylphenyl
(357) 3,4,5-tri(2-methoxy-2-ethoxyethyl)phenyl
(358) 3,4,5-triphenylphenyl
(359) 3,4,5-triethoxycarbonylphenyl
(360) 3,4,5-tridodecyloxyphenyl
(361) 3,4,5-trimethylphenyl
(362) 3,4,5-trichlorophenyl
(363) 3,4,5-tribenzoylphenyl
(364) 3,4,5-triacetoxyphenyl
(365) 3,4,5-trimethoxyphenyl
(366) 3,4,5-tri-N-methylaminophenyl
(367) 3,4,5-triisobutyrylaminophenyl
(368) 3,4,5-triphenoxyphenyl
(369) 3,4,5-trihydroxyphenyl
(370) 2,4,6-tributylphenyl
(371) 2,4,6-tri(2-methoxy-2-ethoxyethyl)phenyl
(372) 2,4,6-triphenylphenyl
(373) 2,4,6-triethoxycarbonylphenyl
(374) 2,4,6-tridodecyloxyphenyl
(375) 2,4,6-trimethylphenyl
(376) 2,4,6-trichlorophenyl
(377) 2,4,6-tribenzoylphenyl
(378) 2,4,6-triacetoxyphenyl
(379) 2,4,6-trimethoxyphenyl
(380) 2,4,6-tri-N-methylaminophenyl
(381) 2,4,6-triisobutyrylaminophenyl
(382) 2,4,6-triphenoxyphenyl
(383) 2,4,6-trihydroxyphenyl
(384) pentafluorophenyl
(385) pentachlorophenyl
(386) pentamethoxyphenyl
(387) 6-N-methylsulfamoyl-8-methoxy-2-naphthyl
(388) 5-N-methylsulfamoyl-2-naphthyl
(389) 6-N-phenylsulfamoyl-2-naphthyl
(390) 5-ethoxy-7-N-methylsulfamoyl-2-naphthyl
(391) 3-methoxy-2-naphthyl
(392) 1-ethoxy-2-naphthyl
(393) 6-N-phenylsulfamoyl-8-methoxy-2-naphthyl
(394) 5-methoxy-7-N-phenyl sulfamoyl-2-naphthyl
(395) 1-(4-methylphenyl)-2-naphthyl
(396) 6,8-di-N-methylsulfamoyl-2-naphthyl
(397) 6-N-2-acetoxyethylsulfamoyl-8-methoxy-2-naphthyl
(398) 5-acetoxy-7-N-phenylsulfamoyl-2-naphthyl
(399) 3-benzoyloxy-2-naphthyl
(400) 5-acetylamino-1-naphthyl
(401) 2-methoxy-1-naphthyl
(402) 4-phenoxy-1-naphthyl (403) 5-N-methylsulfamoyl-1-naphthyl
(404) 3-N-methylcarbamoyl-4-hydroxy-1-naphthyl
(405) 5-methoxy-6-N-ethylsulfamoyl-1-naphthyl
(406) 7-tetradecyloxy-1-naphthyl
(407) 4-(4-methylphenoxy)-1-naphthyl
(408) 6-N-methylsulfamoyl-1-naphthyl
(409) 3-N,N-dimethylcarbamoyl-4-methoxy-1-naphthyl
(410) 5-methoxy-6-N-benzylsul-famoyl-1-naphthyl
(411) 3,6-di-N-phenylsulfamoyl-1-naphthyl
(412) methyl
(413) ethyl
(414) butyl
(415) octyl
(416) dodecyl
(417) 2-butoxy-2-ethoxyethyl
(418) benzyl
(419) 4-methoxybenzyl

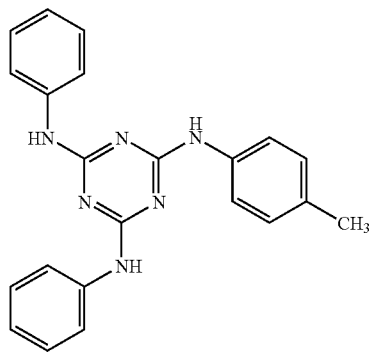
(420)

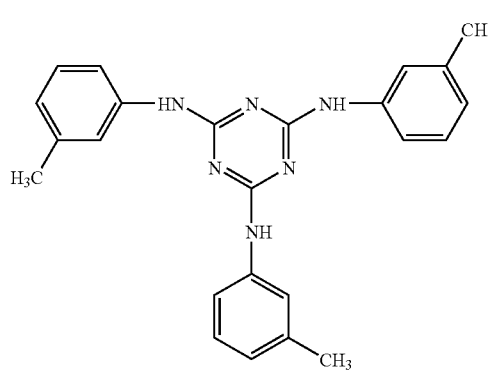
(420')

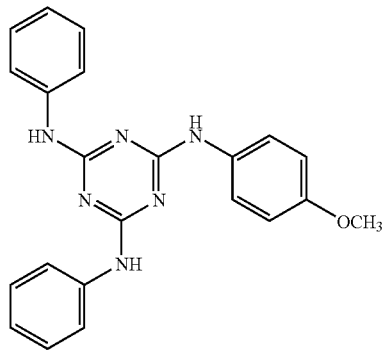
(421)

-continued

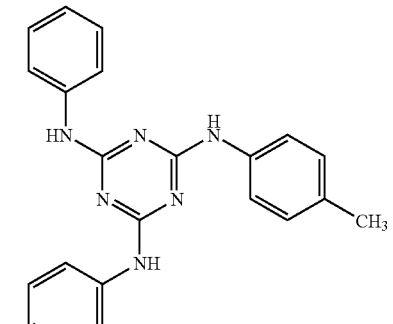
(422)

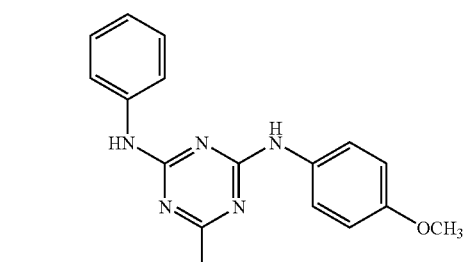
(423)

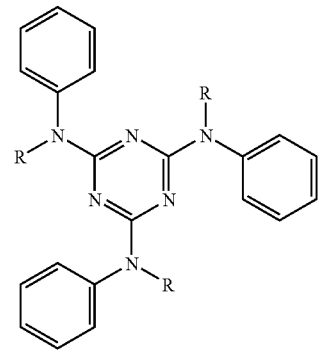
(424)–(426)

(424) methyl
(425) phenyl
(426) butyl

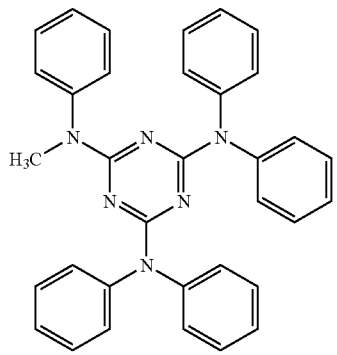
(427)

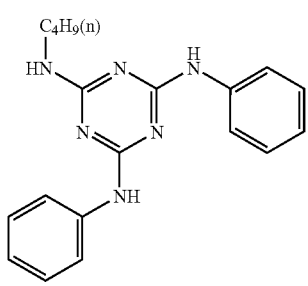
(428)
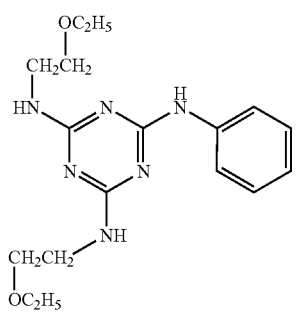
(429)
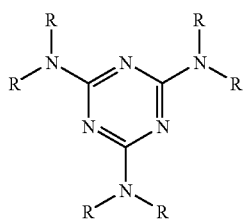
(430) methyl
(431) ethyl
(432) butyl
(433) octyl
(434) dodecyl
(435) 2-butoxy-2-ethoxyethyl
(436) benzyl
(437) 4-methoxybenzyl
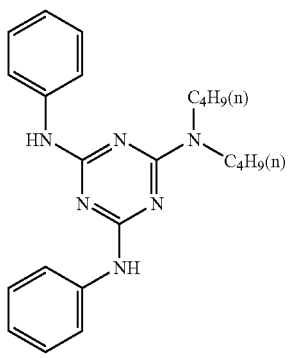
(438)
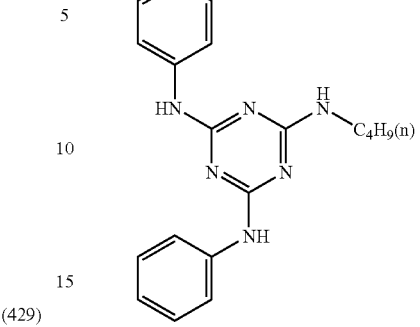
(439)
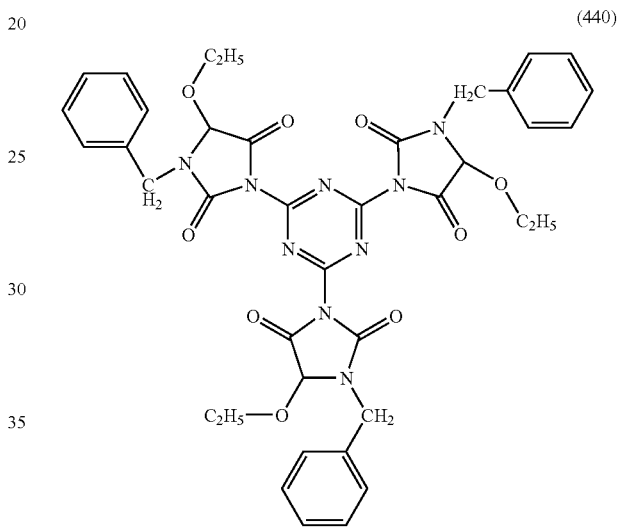
(440)
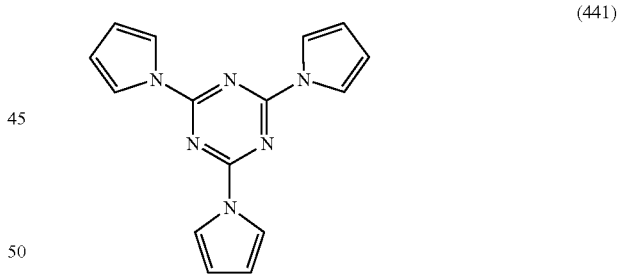
(441)
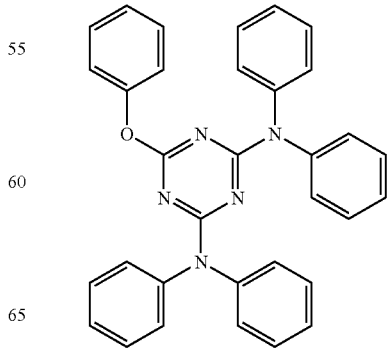
(442)

-continued (443)

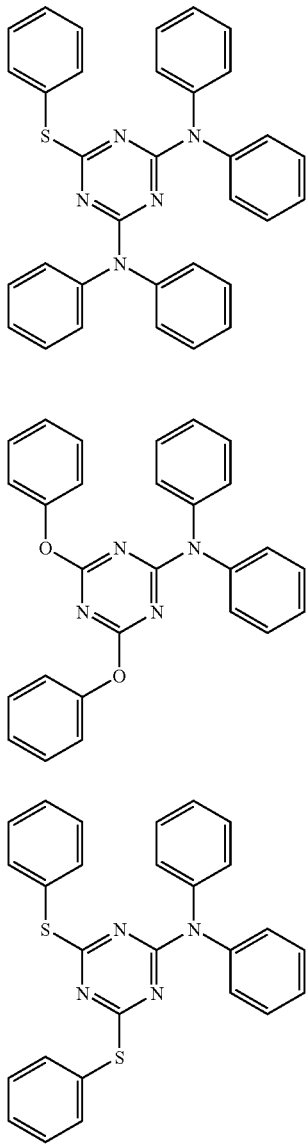

(444)

(445)

In the present invention, a melamine polymer may be used a compound having 1,3, and 5-triazine ring. A melamine polymer is preferably prepared through a polymerization reaction of a melamine compound represented by Formula (B) and a carbonyl compound.

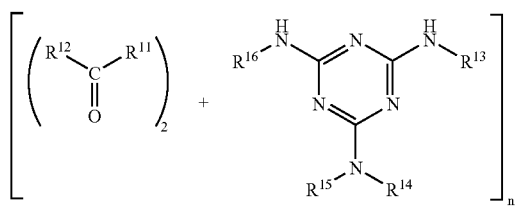

Formula (B)

-continued

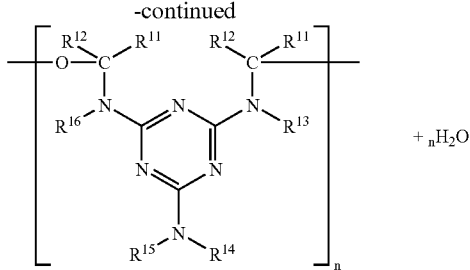

$+ _nH_2O$

In the above reaction scheme, $R^{11}$, $R^{12}$, $R^{13}$, $R^{14}$, $R^{15}$, and $R^{16}$ each represents an alkyl group, an alkenyl group, an aryl group, or a heterocyclic group.

The above alkyl group, an alkenyl group, an aryl group, heterocyclic groups, and these substituents are common to those aforementioned in relation to Formula (A).

The polymerization reaction of a melamine compound and carbonyl compounds is carried out in same manner as a usual synthetic method of a melamine resin (for example, a melamine formaldehyde resin). A commercially available melamine polymer (melamine resin) may also be used.

The molecular weight of a melamine polymer is preferably 2000 to 400,000. Examples of a repeat unit will be shown below:

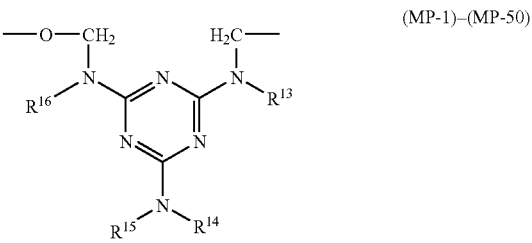

(MP-1)–(MP-50)

MP-1: $R^{13}$, $R^{14}$, $R^{15}$, $R^{16}$:$CH_2OH$
MP-2: $R^{13}$, $R^{14}$, $R^{15}$, $R^{16}$:$CH_2OCH_3$
MP-3: $R^{13}$, $R^{14}$, $R^{15}$, $R^{16}$:$CH_2O$-i-$C_4H_9$
MP-4: $R^{13}$, $R^{14}$, $R^{15}$, $R^{16}$:$CH_2O$-n-$C_4H_9$
MP-5: $R^{13}$, $R^{14}$, $R^{15}$, $R^{16}$:$CH_2NHCOCH=CH_2$
MP-6: $R^{13}$, $R^{14}$, $R^{15}$, $R^{16}$:$CH_2NHCO(CH_2)7CH=CH(CH_2)7CH_3$
MP-7: $R^{13}$, $R^{14}$, $R^{15}$:$CH_2OH$; $R^{16}$:$CH_2OCH_3$
MP-8: $R^{13}$, $R^{14}$, $R^{16}$:$CH_2OH$; $R^{15}$:$CH_2OCH_3$
MP-9: $R^{13}$, $R^{14}$:$CH_2OH$; $R^{15}$, $R^{16}$:$CH_2OCH_3$
MP-10: $R^{13}$, $R^{16}$:$CH_2OH$; $R^{14}$, $R^{15}$:$CH_2OCH_3$
MP-11: $R^{13}$:$CH_2OH$; $R^{14}$, $R^{15}$, $R^{16}$:$CH_2OCH_3$
MP-12: $R^{13}$, $R^{14}$, $R^{16}$:$CH_2OCH_3$; $R^{15}$:$CH_2OH$
MP-13: $R^{13}$, $R^{16}$:$CH_2OCH_3$; $R^{14}$, $R^{15}$:$CH_2OH$
MP-14: $R^{13}$, $R^{14}$, $R^{15}$:$CH_2OH$; $R^{16}$:$CH_2O$-i-$C_4H_9$
MP-15: $R^{13}$, $R^{14}$, $R^{16}$:$CH_2OH$; $R^{15}$:$CH_2O$-i-$C_4H_9$
MP-16: $R^{13}$, $R^{16}$:$CH_2OH$; $R^{14}$, $R^{15}$:$CH_2O$-i-$C_4H_9$
MP-17: $R^{13}$, $R^{16}$:$CH_2OH$; $R^{14}$, $R^{15}$:$CH_2O$-i-$C_4H_9$
MP-18: $R^{13}$:$CH_2OH$; $R^{14}$, $R^{15}$, $R^{16}$:$CH_2O$-i-$C_4H_9$
MP-19: $R^{13}$, $R^{14}$, $R^{16}$:$CH_2O$-i-$C_4H_9$; $R^{15}$:$CH_2OH$
MP-20: $R^{13}$, $R^{16}$:$CH_2O$-i-$C_4H_9$; $R^{14}$, $R^{15}$:$CH_2OH$
MP-21: $R^{13}$, $R^{14}$, $R^{15}$:$CH_2OH$; $R^{16}$:$CH_2O$-n-$C_4H_9$
MP-22: $R^{13}$, $R^{14}$, $R^{16}$:$CH_2OH$; $R^{15}$:$CH_2O$-n-$C_4H_9$
MP-23: $R^{13}$, $R^{14}$:$CH_2OH$; $R^{15}$, $R^{16}$:$CH_2O$-n-$C_4H_9$
MP-24: $R^{13}$, $R^{16}$:$CH_2OH$; $R^{14}$, $R^{15}$:$CH_2O$-n-$C_4H_9$
MP-25: $R^{13}$:$CH_2OH$; $R^{14}$, $R^{15}$, $R^{16}$:$CH_2O$-n-$C_4H_9$
MP-26: $R^{13}$, $R^{14}$, $R^{16}$:$CH_2O$-n-$C_4H_9$; $R^{15}$:$CH_2OH$

MP-27: $R^{13}$, $R^{16}$:$CH_2O$-n-$C_4H_9$; $R^{14}$, $R^{15}$:$CH_2OH$
MP-28: $R^{13}$, $R^{14}$:$CH_2OH$; $R^{15}$:$CH_2OCH_3$; $R^{16}$:$CH_2O$-n-$C_4H_9$
MP-29: $R^{13}$, $R^{14}$:$CH_2OH$; $R^{15}$:$CH_2O$-n-$C_4H_9$; $R^{16}$:$CH_2OCH_3$
MP-30: $R^{13}$, $R^{16}$:$CH_2OH$; $R^{14}$:$CH_2OCH_3$; $R^{15}$:$CH_2O$-n-$C_4H_9$
MP-31: $R^{13}$:$CH_2OH$; $R^{14}$, $R^{15}$:$CH_2OCH_3$; $R^{16}$:$CH_2O$-n-$C_4H_9$
MP-32: $R^{13}$:$CH_2OH$; $R^{14}$, $R^{16}$:$CH_2OCH_3$; $R^{15}$:$CH_2O$-n-$C_4H_9$
MP-33: $R^{13}$:$CH_2OH$; $R^{14}$:$CH_2OCH_3$; $R^{15}$, $R^{16}$:$CH_2O$-n-$C_4H_9$
MP-34: $R^{13}$:$CH_2OH$; $R^{14}$, $R^{15}$:$CH_2O$-n-$C_4H_9$; $R^{16}$:$CH_2OCH_3$
MP-35: $R^{13}$, $R^{14}$:$CH_2OCH_3$; $R^{15}$:$CH_2OH$; $R^{16}$:$CH_2O$-n-$C_4H_9$
MP-36: $R^{13}$, $R^{16}$:$CH_2OCH_3$; $R^{14}$:$CH_2OH$; $R^{15}$:$CH_2O$-n-$C_4H_9$
MP-37: $R^{13}$:$CH_2OCH_3$; $R^{14}$, $R^{15}$:$CH_2OH$; $R^{16}$:$CH_2O$-n-$C_4H_9$
MP-38: $R^{13}$, $R^{16}$:$CH_2O$-n-$C_4H_9$; $R^{14}$:$CH_2OCH_3$; $R^{15}$:$CH_2OH$
MP-39: $R^{13}$:$CH_2OH$; $R^{14}$:$CH_2OCH_3$; $R^{15}$:$CH_2O$-n-$C_4H_9$; $R^{16}$:$CH_2NHCOCH=CH_2$
MP-40: $R^{13}$:$CH_2OH$; $R^{14}$:$CH_2OCH_3$; $R^{15}$:$CH_2NHCOCH=CH_2$; $R^{16}$:$CH_2O$-n-$C_4H_9$
MP-41: $R^{13}$:$CH_2OH$; $R^{14}$:$CH_2O$-n-$C_4H_9$; $R^{15}$:$CH_2NHCOCH=CH_2$; $R^{16}$:$CH_2OCH_3$
MP-42: $R^{13}$:$CH_2OCH_3$; $R^{14}$:$CH_2OH$; $R^{15}$:$CH_2O$-n-$C_4H_9$; $R^{16}$:$CH_2NHCOCH=CH_2$
MP-43: $R^{13}$:$CH_2OCH_3$; $R^{14}$:$CH_2OH$; $R^{15}$:$CH_2NHCOCH=CH_2$; $R^{16}$:$CH_2O$-n-$C_4H_9$
MP-44: $R^{13}$:$CH_2O$-n-$C_4H_9$; $R^{14}$:$CH_2OCH_3$; $R^{15}$:$CH_2OH$; $R^{16}$:$CH_2NHCOCH=CH_2$
MP-45: $R^{13}$:$CH_2OH$; $R^{14}$:$CH_2OCH_3$; $R^{15}$:$CH_2NHCO(CH_2)_7CH=CH(CH_2)_7CH_3$; $R^{16}$:$CH_2NHCOCH=CH_2$
MP-46: $R^{13}$:$CH_2OH$; $R^{14}$:$CH_2OCH_3$; $R^{15}$:$CH_2NHCOCH=CH_2$; $R^{16}$:$CH_2NHCO(CH_2)_7CH=CH(CH_2)_7CH_3$
MP-47: $R^{13}$:$CH_2OH$; $R^{14}$:$CH_2NHCO(CH_2)_7CH=CH(CH_2)_7CH_3$; $R^{15}$:$CH_2NHCOCH=CH_2$; $R^{16}$:$CH_2OCH_3$
MP-48: $R^{13}$:$CH_2OCH_3$; $R^{14}$:$CH_2OH$; $R^{15}$:$CH_2NHCO(CH_2)_7CH=CH(CH_2)_7CH_3$; $R^{16}$:$CH_2NHCOCH=CH_2$
MP-49: $R^{13}$:$CH_2OCH_3$; $R^{14}$:$CH_2OH$; $R^{15}$:$CH_2NHCOCH=CH_2$; $R^{16}$:$CH_2NHCO(CH_2)_7CH=CH(CH_2)_7CH_3$
MP-50: $R^{13}$:$CH_2NHCO(CH_2)_7CH=CH(CH_2)_7CH_3$; $R^{14}$:$CH_2OCH_3$; $R^{15}$:$CH_2OH$; $R^{16}$:$CH_2NHCOCH=CH_2$

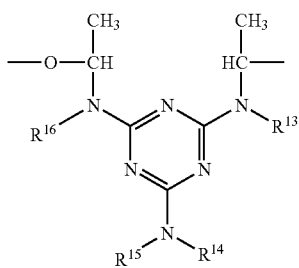

(MP-51)–(MP-100)

MP-51: $R^{13}$, $R^{14}$, $R^{15}$, $R^{16}$:$CH_2OH$
MP-52: $R^{13}$, $R^{14}$, $R^{15}$, $R^{16}$:$CH_2OCH_3$
MP-53: $R^{13}$, $R^{14}$, $R^{15}$, $R^{16}$:$CH_2O$-i-$C_4H_9$
MP-54: $R^{13}$, $R^{14}$, $R^{15}$, $R^{16}$:$CH_2O$-n-$C_4H_9$
MP-55: $R^{13}$, $R^{14}$, $R^{15}$, $R^{16}$:$CH_2NHCOCH=CH_2$
MP-56: $R^{13}$, $R^{14}$, $R^{15}$, $R^{16}$:$CH_2NHCO(CH_2)_7CH=CH(CH_2)_7CH_3$
MP-57: $R^{13}$, $R^{14}$, $R^{15}$:$CH_2OH$; $R^{16}$:$CH_2OCH_3$
MP-58: $R^{13}$, $R^{14}$, $R^{16}$:$CH_2OH$; $R^{15}$:$CH_2OCH_3$
MP-59: $R^{13}$, $R^{14}$:$CH_2OH$; $R^{15}$, $R^{16}$:$CH_2OCH_3$
MP-60: $R^{13}$, $R^{16}$:$CH_2OH$; $R^{14}$, $R^{15}$:$CH_2OCH_3$
MP-61: $R^{13}$:$CH_2OH$; $R^{14}$, $R^{15}$, $R^{16}$:$CH_2OCH_3$
MP-62: $R^{13}$, $R^{14}$, $R^{16}$:$CH_2OCH_3$; $R^{15}$:$CH_2OH$
MP-63: $R^{13}$, $R^{16}$:$CH_2OCH_3$; $R^{14}$, $R^{15}$:$CH_2OH$
MP-64: $R^{13}$, $R^{14}$, $R^{15}$:$CH_2OH$; $R^{16}$:$CH_2O$-i-$C_4H_9$
MP-65: $R^{13}$, $R^{14}$, $R^{16}$:$CH_2OH$; $R^{15}$:$CH_2O$-i-$C_4H_9$
MP-66: $R^{13}$, $R^{14}$:$CH_2OH$; $R^{15}$, $R^{16}$:$CH_2O$-i-$C_4H_9$
MP-67: $R^{13}$, $R^{16}$:$CH_2OH$; $R^{14}$, $R^{15}$:$CH_2O$-i-$C_4H_9$
MP-68: $R^{13}$:$CH_2OH$; $R^{14}$, $R^{15}$, $R^{16}$:$CH_2O$-i-$C_4H_9$
MP-69: $R^{13}$, $R^{14}$, $R^{16}$:$CH_2O$-i-$C_4H_9$; $R^{15}$:$CH_2OH$
MP-70: $R^{13}$, $R^{16}$:$CH_2O$-i-$C_4H_9$; $R^{14}$, $R^{15}$:$CH_2OH$
MP-71: $R^{13}$, $R^{14}$, $R^{15}$:$CH_2OH$; $R^{16}$:$CH_2O$-n-$C_4H_9$
MP-72: $R^{13}$, $R^{14}$, $R^{16}$:$CH_2OH$; $R^{15}$:$CH_2O$-n-$C_4H_9$
MP-73: $R^{13}$, $R^{14}$:$CH_2OH$; $R^{15}$, $R^{16}$:$CH_2O$-n-$C_4H_9$
MP-74: $R^{13}$, $R^{16}$:$CH_2OH$; $R^{14}$, $R^{15}$:$CH_2O$-n-$C_4H_9$
MP-75: $R^{13}$:$CH_2OH$; $R^{14}$, $R^{15}$, $R^{16}$:$CH_2O$-n-$C_4H_9$
MP-76: $R^{13}$, $R^{14}$, $R^{16}$:$CH_2O$-n-$C_4H_9$; $R^{15}$:$CH_2OH$
MP-77: $R^{13}$, $R^{16}$:$CH_2O$-n-$C_4H_9$; $R^{14}$, $R^{15}$:$CH_2OH$
MP-78: $R^{13}$, $R^{14}$:$CH_2OH$; $R^{15}$:$CH_2OCH_3$; $R^{16}$:$CH_2O$-n-$C_4H_9$
MP-79: $R^{13}$, $R^{14}$:$CH_2OH$; $R^{15}$:$CH_2O$-n-$C_4H_9$; $R^{16}$:$CH_2OCH_3$
MP-80: $R^{13}$, $R^{16}$:$CH_2OH$; $R^{14}$:$CH_2OCH_3$; $R^{15}$:$CH_2O$-n-$C_4H_9$
MP-81: $R^{13}$:$CH_2OH$; $R^{14}$, $R^{15}$:$CH_2OCH_3$; $R^{16}$:$CH_2O$-n-$C_4H_9$
MP-82: $R^{13}$:$CH_2OH$; $R^{14}$, $R^{16}$:$CH_2OCH_3$; $R^{15}$:$CH_2O$-n-$C_4H_9$
MP-83: $R^{13}$:$CH_2OH$; $R^{14}$:$CH_2OCH_3$; $R^{15}$, $R^{16}$:$CH_2O$-n-$C_4H_9$
MP-84: $R^{13}$:$CH_2OH$; $R^{14}$, $R^{15}$:$CH_2O$-n-$C_4H_9$; $R^{16}$:$CH_2OCH_3$
MP-85: $R^{13}$, $R^{14}$:$CH_2OCH_3$; $R^{15}$:$CH_2OH$; $R^{16}$:$CH_2O$-n-$C_4H_9$
MP-86: $R^{13}$, $R^{16}$:$CH_2OCH_3$; $R^{14}$:$CH_2OH$; $R^{15}$:$CH_2O$-n-$C_4H_9$
MP-87: $R^{13}$:$CH_2OCH_3$; $R^{14}$, $R^{15}$:$CH_2OH$; $R^{16}$:$CH_2O$-n-$C_4H_9$
MP-88: $R^{13}$, $R^{16}$:$CH_2O$-n-$C_4H_9$; $R^{14}$:$CH_2OCH_3$; $R^{15}$:$CH_2OH$
MP-89: $R^{13}$:$CH_2OH$; $R^{14}$:$CH_2OCH_3$; $R^{15}$:$CH_2O$-n-$C_4H_9$; $R^{16}$:$CH_2NHCOCH=CH_2$
MP-90: $R^{13}$:$CH_2OH$; $R^{14}$:$CH_2OCH_3$; $R^{15}$:$CH_2NHCOCH=CH_2$; $R^{16}$:$CH_2O$-n-$C_4H_9$
MP-91: $R^{13}$:$CH_2OH$; $R^{14}$:$CH_2O$-n-$C_4H_9$; $R^{15}$:$CH_2NHCOCH=CH_2$; $R^{16}$:$CH_2OCH_3$
MP-92: $R^{13}$:$CH_2OCH_3$; $R^{14}$:$CH_2OH$; $R^{15}$:$CH_2O$-n-$C_4H_9$; $R^{16}$:$CH_2NHCOCH=CH_2$
MP-93: $R^{13}$:$CH_2OCH_3$; $R^{14}$:$CH_2OH$; $R^{15}$:$CH_2NHCOCH=CH_2$; $R^{16}$:$CH_2O$-n-$C_4H_9$
MP-94: $R^{13}$:$CH_2O$-n-$C_4H_9$; $R^4$:$CH_2OCH_3$; $R^{15}$:$CH_2OH$; $R^{16}$:$CH_2NHCOCH=CH_2$
MP-95: $R^{13}$:$CH_2OH$; $R^{14}$:$CH_2OCH_3$; $R^{15}$:$CH_2NHCO(CH_2)_7CH=CH(CH_2)_7CH_3$; $R^{16}$:$CH_2NHCOCH=CH_2$
MP-96: $R^{13}$:$CH_2OH$; $R^{14}$:$CH_2OCH_3$; $R^{15}$:$CH_2NHCOCH=CH_2$; $R^{16}$:$CH_2NHCO(CH_2)_7CH=CH(CH_2)_7CH_3$
MP-97: $R^{13}$:$CH_2OH$; $R^{14}$:$CH_2NHCO(CH_2)_7CH=CH(CH_2)_7CH_3$; $R^{15}$:$CH_2NHCOCH=CH_2$; $R^{16}$:$CH_2OCH_3$

MP-98: R$^{13}$:CH$_2$OCH$_3$; R$^{14}$:CH$_2$OH; R$^{15}$:CH$_2$NHCO(CH$_2$)7CH=CH(CH$_2$)7CH$_3$; R$^{16}$:CH$_2$NHCOCH=CH$_2$
MP-99: R$^{13}$:CH$_2$OCH$_3$; R$^{14}$:CH$_2$OH; R$^{15}$:CH$_2$NHCOCH=CH$_2$; R$^{16}$:CH$_2$NHCO(CH$_2$)7CH=CH(CH$_2$)7CH$_3$
MP-100: R$^{13}$:CH$_2$NHCO(CH$_2$)7CH=CH(CH$_2$)7CH$_3$; R$^{14}$:CH$_2$OCH$_3$; R$^{15}$:CH$_2$OH; R$^{16}$:CH$_2$NHCOCH=CH$_2$ (MP-101)–(MP-150)

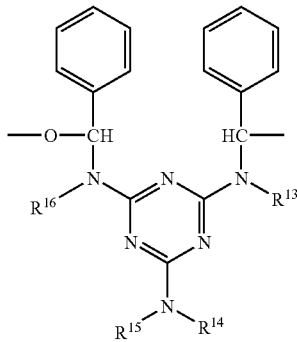

MP-101: R$^{13}$, R$^{14}$, R$^{15}$, R$^{16}$:CH$_2$OH
MP-102: R$^{13}$, R$^{14}$, R$^{15}$, R$^{16}$:CH$_2$OCH$_3$
MP-103: R$^{13}$, R$^{14}$, R$^{15}$, R$^{16}$:CH$_2$O-i-C$_4$H$_9$
MP-104: R$^{13}$, R$^{14}$, R$^{15}$, R$^{16}$:CH$_2$O-n-C$_4$H$_9$
MP-105: R$^{13}$, R$^{14}$, R$^{15}$, R$^{16}$:CH$_2$NHCOCH=CH$_2$
MP-106: R$^{13}$, R$^{14}$, R$^{15}$, R$^{16}$:CH$_2$NHCO(CH$_2$)7CH=CH(CH$_2$)7CH$_3$
MP-107: R$^{13}$, R$^{14}$, R$^{15}$:CH$_2$OH; R$^{16}$:CH$_2$OCH$_3$
MP-108: R$^{13}$, R$^{14}$, R$^{16}$:CH$_2$OH; R$^{15}$:CH$_2$OCH$_3$
MP-109: R$^{13}$, R$^{14}$:CH$_2$OH; R$^{15}$, R$^{16}$:CH$_2$OCH$_3$
MP-110: R$^{13}$, R$^{16}$:CH$_2$OH; R$^{14}$, R$^{15}$:CH$_2$OCH$_3$
MP-111: R$^{13}$:CH$_2$OH; R$^{14}$, R$^{15}$, R$^{16}$:CH$_2$OCH$_3$
MP-112: R$^{13}$, R$^{14}$, R$^{16}$:CH$_2$OCH$_3$; R$^{15}$:CH$_2$OH
MP-113: R$^{13}$, R$^{16}$:CH$_2$OCH$_3$; R$^{14}$, R$^{15}$:CH$_2$OH
MP-114: R$^{13}$, R$^{14}$, R$^{15}$:CH$_2$OH; R$^{16}$:CH$_2$O-i-C$_4$H$_9$
MP-115: R$^{13}$, R$^{14}$, R$^{16}$:CH$_2$OH; R$^{15}$:CH$_2$O-i-C$_4$H$_9$
MP-116: R$^{13}$, R$^{14}$:CH$_2$OH; R$^{15}$, R$^{16}$:CH$_2$O-i-C$_4$H$_9$
MP-117: R$^{13}$, R$^{16}$:CH$_2$OH; R$^{14}$, R$^{15}$:CH$_2$O-i-C$_4$H$_9$
MP-118: R$^{13}$, CH$_2$OH; R$^{14}$, R$^{15}$, R$^{16}$:CH$_2$O-i-C$_4$H$_9$
MP-119: R$^{13}$, R$^{14}$, R$^{16}$:CH$_2$O-i-C$_4$H$_9$; R$^{15}$:CH$_2$OH
MP-120: R$^{13}$, R$^{16}$:CH$_2$O-i-C$_4$H$_9$; R$^{14}$, R$^{15}$:CH$_2$OH
MP-121: R$^{13}$, R$^{14}$, R$^{15}$:CH$_2$OH; R$^{16}$:CH$_2$O-n-C$_4$H$_9$
MP-122: R$^{13}$, R$^{14}$, R$^{16}$:CH$_2$OH; R$^{15}$:CH$_2$O-n-C$_4$H$_9$
MP-123: R$^{13}$, R$^{14}$:CH$_2$OH; R$^{15}$, R$^{16}$:CH$_2$O-n-C$_4$H$_9$
MP-124: R$^{13}$, R$^{16}$:CH$_2$OH; R$^{14}$, R$^{15}$:CH$_2$O-n-C$_4$H$_9$
MP-125: R$^{13}$:CH$_2$OH; R$^{14}$, R$^{15}$, R$^{16}$:CH$_2$O-n-C$_4$H$_9$
MP-126: R$^{13}$, R$^{14}$, R$^{16}$:CH$_2$O-n-C$_4$H$_9$; R$^{15}$:CH$_2$OH
MP-127: R$^{13}$, R$^{16}$:CH$_2$O-n-C$_4$H$_9$; R$^{14}$, R$^{15}$:CH$_2$OH
MP-128: R$^{13}$, R$^{14}$:CH$_2$OH; R$^{15}$:CH$_2$OCH$_3$; R$^{16}$:CH$_2$O-n-C$_4$H$_9$
MP-129: R$^{13}$, R$^{14}$:CH$_2$OH; R$^{15}$:CH$_2$O-n-C$_4$H$_9$; R$^{16}$:CH$_2$OCH$_3$
MP-130: R$^{13}$, R$^{16}$:CH$_2$OH; R$^{14}$:CH$_2$OCH$_3$; R$^{15}$:CH$_2$O-n-C$_4$H$_9$
MP-131: R$^{13}$:CH$_2$OH; R$^{14}$, R$^{15}$:CH$_2$OCH$_3$; R$^{16}$:CH$_2$O-n-C$_4$H$_9$
MP-132: R$^{13}$:CH$_2$OH; R$^{14}$, R$^{16}$:CH$_2$OCH$_3$; R$^{15}$:CH$_2$O-n-C$_4$H$_9$
MP-133: R$^{13}$:CH$_2$OH; R$^{14}$:CH$_2$OCH$_3$; R$^{15}$, R$^{16}$:CH$_2$O-n-C$_4$H$_9$
MP-134: R$^{13}$:CH$_2$OH; R$^{14}$, R$^{15}$:CH$_2$O-n-C$_4$H$_9$; R$^{16}$:CH$_2$OCH$_3$
MP-135: R$^{13}$, R$^{14}$:CH$_2$OCH$_3$; R$^{15}$:CH$_2$OH; R$^{16}$:CH$_2$O-n-C$_4$H$_9$
MP-136: R$^{13}$, R$^{16}$:CH$_2$OCH$_3$; R$^{14}$:CH$_2$OH; R$^{15}$:CH$_2$O-n-C$_4$H$_9$
MP-137: R$^{13}$:CH$_2$OCH$_3$; R$^{14}$, R$^{16}$:CH$_2$OH; R$^{16}$:CH$_2$O-n-C$_4$H$_9$
MP-138: R$^{13}$, R$^{16}$:CH$_2$O-n-C$_4$H$_9$; R$^{14}$:CH$_2$OCH$_3$; R$^{15}$:CH$_2$OH
MP-139: R$^{13}$:CH$_2$OH; R$^{14}$:CH$_2$OCH$_3$; R$^{15}$:CH$_2$O-n-C$_4$H$_9$; R$^{16}$:CH$_2$NHCOCH=CH$_2$
MP-140: R$^{13}$:CH$_2$OH; R$^{14}$:CH$_2$OCH$_3$; R$^{15}$:CH$_2$NHCOCH=CH$_2$; R$^{16}$:CH$_2$O-n-C$_4$H$_9$
MP-141: R$^{13}$:CH$_2$OH; R$^{14}$:CH$_2$O-n-C$_4$H$_9$; R$^{15}$:CH$_2$NHCOCH=CH$_2$; R$^{16}$:CH$_2$OCH$_3$
MP-142: R$^{13}$:CH$_2$OCH$_3$; R$^{14}$:CH$_2$OH; R$^{15}$:CH$_2$O-n-C$_4$H$_9$; R$^{16}$:CH$_2$NHCOCH=CH$_2$
MP-143: R$^{13}$:CH$_2$OCH$_3$; R$^{14}$:CH$_2$OH; R$^{15}$:CH$_2$NHCOCH=CH$_2$; R$^{16}$:CH$_2$O-n-C$_4$H$_9$
MP-144: R$^{13}$:CH$_2$O-n-C$_4$H$_9$; R$^{14}$:CH$_2$OCH$_3$; R$^{15}$:CH$_2$OH; R$^{16}$:CH$_2$NHCOCH=CH$_2$
MP-145: R$^{13}$:CH$_2$OH; R$^{14}$:CH$_2$OCH$_3$; R$^{15}$:CH$_2$NHCO(CH$_2$)7CH=CH(CH$_2$)7CH$_3$; R$^{16}$:CH$_2$NHCOCH=CH$_2$
MP-146: R$^{13}$:CH$_2$OH; R$^{14}$:CH$_2$OCH$_3$; R$^{15}$:CH$_2$NHCOCH=CH$_2$; R$^{16}$:CH$_2$NHCO(CH$_2$)7CH=CH(CH$_2$)7CH$_3$
MP-147: R$^{13}$:CH$_2$OH; R$^{14}$:CH$_2$NHCO(CH$_2$)7CH=CH(CH$_2$)7CH$_3$; R$^{15}$:CH$_2$NHCOCH=CH$_2$; R$^{16}$:CH$_2$OCH$_3$
MP-148: R$^{13}$:CH$_2$OCH$_3$; R$^{14}$:CH$_2$OH; R$^{15}$:CH$_2$NHCO(CH$_2$)7CH=CH(CH$_2$)7CH$_3$; R$^{16}$:CH$_2$NHCOCH=CH$_2$
MP-149: R$^{13}$:CH$_2$OCH$_3$; R$^{14}$:CH$_2$OH; R$^{15}$:CH$_2$NHCOCH=CH$_2$; R$^{16}$:CH$_2$NHCO(CH$_2$)7CH=CH(CH$_2$)7CH$_3$
MP-150: R$^{13}$:CH$_2$NHCO(CH$_2$)7CH=CH(CH$_2$)7CH$_3$; R$^{14}$:CH$_2$OCH$_3$; R$^{15}$:CH$_2$OH; R$^{16}$:CH$_2$NHCOCH=CH$_2$ (MP-151)–(MP-200)

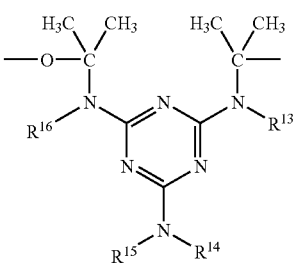

MP-151: R$^{13}$, R$^{14}$, R$^{15}$, R$^{16}$:CH$_2$OH
MP-152: R$^{13}$, R$^{14}$, R$^{15}$, R$^{16}$:CH$_2$OCH$_3$
MP-153: R$^{13}$, R$^{14}$, R$^{15}$, R$^{16}$:CH$_2$O-i-C$_4$H$_9$
MP-154: R$^{13}$, R$^{14}$, R$^{15}$, R$^{16}$:CH$_2$O-n-C$_4$H$_9$
MP-155: R$^{13}$, R$^{14}$, R$^{15}$, R$^{16}$:CH$_2$NHCOCH=CH$_2$
MP-156: R$^{13}$, R$^{14}$, R$^{15}$, R$^{16}$:CH$_2$NHCO(CH$_2$)7CH=CH(CH$_2$)7CH$_3$
MP-157: R$^{13}$, R$^{14}$, R$^{15}$:CH$_2$OH; R$^{16}$:CH$_2$OCH$_3$
MP-158: R$^{13}$, R$^{14}$, R$^{16}$:CH$_2$OH; R$^{15}$:CH$_2$OCH$_3$
MP-159: R$^{13}$, R$^{14}$:CH$_2$OH; R$^{15}$, R$^{16}$:CH$_2$OCH$_3$
MP-160: R$^{13}$, R$^{16}$:CH$_2$OH; R$^{14}$, R$^{15}$:CH$_2$OCH$_3$
MP-161: R$^{13}$:CH$_2$OH; R$^{14}$, R$^{15}$, R$^{16}$:CH$_2$OCH$_3$
MP-162: R$^{13}$, R$^{14}$, R$^{16}$:CH$_2$OCH$_3$; R$^{15}$:CH$_2$OH
MP-163: R$^{13}$, R$^{16}$:CH$_2$OCH$_3$; R$^{14}$, R$^{15}$:CH$_2$OH
MP-164: R$^{13}$, R$^{14}$, R$^{15}$:CH$_2$OH; R$^{16}$:CH$_2$O-i-C$_4$H$_9$
MP-165: R$^{13}$, R$^{14}$, R$^{16}$:CH$_2$OH; R$^{15}$:CH$_2$O-i-C$_4$H$_9$
MP-166: R$^{13}$, R$^{14}$:CH$_2$OH; R$^{15}$, R$^{16}$:CH$_2$O-i-C$_4$H$_9$
MP-167: R$^{13}$, R$^{16}$:CH$_2$OH; R$^{14}$, R$^{15}$:CH$_2$O-i-C$_4$H$_9$
MP-168: R$^{13}$:CH$_2$OH; R$^{14}$, R$^{15}$, R$^{16}$:CH$_2$O-i-C$_4$H$_9$

MP-169: $R^{13}$, $R^{14}$, $R^{16}$:$CH_2O$-i-$C_4H_9$; $R^{15}$:$CH_2OH$
MP-170: $R^{13}$, $R^{16}$:$CH_2O$-i-$C_4H_9$; $R^{14}$, $R^{15}$:$CH_2OH$
MP-171: $R^{13}$, $R^{14}$, $R^{15}$:$CH_2OH$; $R^{16}$:$CH_2O$-n-$C_4H_9$
MP-172: $R^{13}$, $R^{14}$, $R^{16}$:$CH_2OH$; $R^{15}$:$CH_2O$-n-$C_4H_9$
MP-173: $R^{13}$, $R^{14}$:$CH_2OH$; $R^{15}$, $R^{16}$:$CH_2O$-n-$C_4H_9$
MP-174: $R^{13}$, $R^{16}$:$CH_2OH$; $R^{15}$, $R^{16}$:$CH_2O$-n-$C_4H_9$
MP-175: $R^{13}$:$CH_2OH$; $R^{14}$, $R^{15}$, $R^{16}$:$CH_2O$-n-$C_4H_9$
MP-176: $R^{13}$, $R^{14}$, $R^{16}$:$CH_2O$-n-$C_4H_9$; $R^{15}$:$CH_2OH$
MP-177: $R^{13}$, $R^{16}$:$CH_2O$-n-$C_4H_9$; $R^{14}$, $R^{15}$:$CH_2OH$
MP-178: $R^{13}$, $R^{14}$:$CH_2OH$; $R^{15}$:$CH_2OCH_3$; $R^{16}$:$CH_2O$-n-$C_4H_9$
MP-179: $R^{13}$, $R^{14}$:$CH_2OH$; $R^{15}$:$CH_2O$-n-$C_4H_9$; $R^{16}$:$CH_2OCH_3$
MP-180: $R^{13}$, $R^{16}$:$CH_2OH$; $R^{14}$:$CH_2OCH_3$; $R^{15}$:$CH_2O$-n-$C_4H_9$
MP-181: $R^{13}$:$CH_2OH$; $R^{14}$, $R^{15}$:$CH_2OCH_3$; $R^{15}$:$CH_2O$-n-$C_4H_9$
MP-182: $R^{13}$:$CH_2OH$; $R^{14}$, $R^{16}$:$CH_2OCH_3$; $R^{15}$:$CH_2O$-n-$C_4H_9$
MP-183: $R^{13}$:$CH_2OH$; $R^{14}$:$CH_2OCH_3$; $R^{15}$, $R^{16}$:$CH_2O$-n-$C_4H_9$
MP-184: $R^{13}$:$CH_2OH$; $R^{14}$, $R^{15}$:$CH_2O$-n-$C_4H_9$; $R^{16}$:$CH_2OCH_3$
MP-185: $R^{13}$, $R^{14}$:$CH_2OCH_3$; $R^{15}$:$CH_2OH$; $R^{16}$:$CH_2O$-n-$C_4H_9$
MP-186: $R^{13}$, $R^{16}$:$CH_2OCH_3$; $R^{14}$:$CH_2OH$; $R^{15}$:$CH_2O$-n-$C_4H_9$
MP-187: $R^{13}$:$CH_2OCH$; $R^{14}$, $R^{15}$:$CH_2OH$; $R^{16}$:$CH_2O$-n-$C_4H_9$
MP-188: $R^{13}$, $R^{16}$:$CH_2O$-n-$C_4H_9$; $R^{14}$:$CH_2OCH_3$; $R^{15}$:$CH_2OH$
MP-189: $R^{13}$:$CH_2OH$; $R^{14}$:$CH_2OCH_3$; $R^{15}$:$CH_2O$-n-$C_4H_9$; $R^{16}$:$CH_2NHCOCH=CH_2$
MP-190: $R^{13}$:$CH_2OH$; $R^{14}$:$CH_2OCH_3$; $R^{15}$:$CH_2NHCOCH=CH_2$; $R^{16}$:$CH_2O$-n-$C_4H_9$
MP-191: $R^{13}$:$CH_2OH$; $R^{14}$:$CH_2O$-n-$C_4H_9$; $R^{15}$:$CH_2NHCOCH=CH_2$; $R^{16}$:$CH_2OCH_3$
MP-192: $R^{13}$:$CH_2OCH_3$; $R^{14}$:$CH_2OH$; $R^{15}$:$CH_2O$-n-$C_4H_9$; $R^{16}$:$CH_2NHCOCH=CH_2$
MP-193: $R^{13}$:$CH_2OCH_3$; $R^{14}$:$CH_2OH$; $R^{15}$:$CH_2NHCOCH=CH_2$; $R^{16}$:$CH_2O$-n-$C_4H_9$
MP-194: $R^{13}$:$CH_2O$-n-$C_4H_9$; $R^{14}$:$CH_2OCH_3$; $R^{15}$:$CH_2OH$; $R^{16}$:$CH_2NHCOCH=CH_2$
MP-195: $R^{13}$:$CH_2OH$; $R^{14}$:$CH_2OCH_3$; $R^{15}$:$CH_2NHCO(CH_2)7CH=CH(CH_2)7CH_3$; $R^{16}$:$CH_2NHCOCH=CH_2$
MP-196: $R^{13}$:$CH_2OH$; $R^{14}$:$CH_2OCH_3$; $R^{15}$:$CH_2NHCOCH=CH_2$; $R^{16}$:$CH_2NHCO(CH_2)7CH=CH(CH_2)7CH_3$
MP-197: $R^{13}$:$CH_2OH$; $R^{14}$:$CH_2NHCO(CH_2)7CH=CH(CH_2)7CH_3$; $R^{15}$:$CH_2NHCOCH=CH_2$; $R^{16}$:$CH_2OCH_3$
MP-198: $R^{13}$:$CH_2OCH_3$; $R^{14}$:$CH_2OH$; $R^{15}$:$CH_2NHCO(CH_2)7CH=CH(CH_2)7CH_3$; $R^{16}$:$CH_2NHCOCH=CH_2$
MP-199: $R^{13}$:$CH_2OCH_3$; $R^{14}$:$CH_2OH$; $R^{15}$:$CH_2NHCOCH=CH_2$; $R^{16}$:$CH_2NHCO(CH_2)7CH=CH(CH_2)7CH_3$
MP-200: $R^{13}$:$CH_2NHCO(CH_2)7CH=CH(CH_2)7CH_3$; $R^{14}$:$CH_2OCH_3$; $R^{15}$:$CH_2OH$; $R^{16}$:$CH_2NHCOCH=CH_2$

A compound having two or more kinds of 1,3,5-triazine rings may be used and two or more discotic compounds (for example, a compound having a 1,3,5-triazine ring and a compound having a porphyrin moiety) are also usable.

Examples of a discotic retardation increasing agent are also disclosed in WO No. 00/65384. The molecular weight of a retardation increasing agent is preferably 300 to 800.

In the present invention, a rod-like compound exhibiting a maximum absorption peak (λmax) at a wavelength shorter than 250 nm in an ultraviolet absorption spectrum of its solution is also used as a retardation-increasing agent.

The rod-like compound has preferably at least one aromatic ring, more preferably at least two aromatic rings in its molecular structure, in consideration of the retardation-increasing function.

Further, the rod-like compound preferably has a linear molecular structure. In other words, it is preferred for the molecule of the compound to be thermally the most stable when it takes a linear posture. What molecular structure is thermally the most stable can be calculated according to the crystal structure analysis or the molecular orbital method. For example, the molecular structure giving the smallest heat of formation can be obtained by calculation according to a molecular orbital calculation program (e.g., WinMO-PAC200, Fujitsu Ltd.). The term "linear molecular structure" means that the thermodynamically most stable molecular structure calculated above has a bending angle of 140° or more even if it is bent.

The rod-like compound is preferably represented by Formula (C):

$$Ar^1-L^1-Ar^2 \qquad \text{Formula (C)}$$

In Formula (c), each of $Ar^1$ and $Ar^2$ is independently an aromatic group.

The term "an aromatic group" in the specification means an aryl (aromatic hydrocarbon) group, a substituted aryl group, an aromatic heterocyclic group or a substituted aromatic heterocyclic group.

An aryl group and a substituted aryl group are more preferable than an aromatic heterocyclic group and a substituted aromatic heterocyclic group. The heterocyclic ring in the aromatic heterocyclic ring is generally unsaturated. The aromatic heterocyclic group preferably contains a 5-, 6- or 7-(more preferably 5- or 6-) membered ring, and more preferably contains a 5- or 6-membered ring. The aromatic heterocyclic ring generally has double bonds as many as possible. The hetero-atom in the heterocyclic group is preferably a nitrogen, oxygen or a sulfur atom, and more preferably a nitrogen or a sulfur atom. Examples of the aromatic heterocyclic ring include: a furan ring, thiophene ring, pyrrole ring, oxazole ring, isoxazole ring, thiazole ring, isothiazole ring, imidazole ring, pyrazole ring, furazane ring, triazole ring, pyran ring, pyridine ring, pyridazine ring, pyrimidine ring, pyrazine ring and a 1,3,5-triazine ring.

Examples of the aromatic ring in the aromatic group include: a benzene ring, furan ring, thiophene ring, pyrrole ring, oxazole ring, thiazole ring, imidazole ring, triazole ring, pyridine ring, pyrimidine ring and a pyrazine ring. Benzene ring is specifically preferable.

Examples of the substituent group of the substituted aryl group or substituted aromatic heterocyclic group include: a halogen atom (F, Cl, Br or I), a hydroxyl, carboxyl, cyano, amino, alkylamino (e.g., methylamino, ethylamino, butylamino, dimethylamino), nitro, sulfo, carbamoyl, alkylcarbamoyl (e.g., N-methylcarbamoyl, N-ethylcarbamoyl, N,N-dimethylcarbamoyl), sulfamoyl, alkylsulfamoyl (e.g., N-methylsulfamoyl, N-ethylsulfamoyl, N,N-dimethylsulfamoyl), ureido, alkylureido (e.g., N-methylureido, N,N-dimethylureido, N,N,N'-trimethylureido), alkyl (e.g., methyl, ethyl, propyl, butyl, pentyl, heptyl, octyl, isopropyl, s-butyl, t-amyl, cyclohexyl, cyclopentyl), alkenyl (e.g., vinyl, allyl. hexenyl), alkynyl (e.g., ethynyl, butynyl), acyl (e.g., formyl, acetyl, butyryl, hexanoyl, lauryl), acyloxy (e.g., acetoxy, butyryloxy, hexanoyloxy, lauryloxy), an alkoxy group (e.g., methoxy, ethoxy, propoxy, butoxy, pentyloxy, heptyloxy, octyloxy), aryloxy (e.g., phenoxy), alkoxycarbonyl (e.g., methoxycarbonyl, ethoxycarbonyl, propoxycarbonyl, butoxycarbonyl, pentyloxycarbonyl, heptyloxycarbonyl), aryloxycarbonyl (e.g., phenoxycarbonyl), alkoxycarbonylamino (e.g., butoxycarbonylamino, hexyloxycarbonylamino), alkylthio (e.g., methylthio, ethylthio, propylthio, butylthio, pentylthio, heptylthio, octylthio), arylthio (e.g., phenylthio), alkylsulfonyl (e.g., methylsulfonyl, ethylsulfonyl, propylsulfonyl, butylsulfonyl, pentylsulfonyl, heptylsulfonyl, octylsulfonyl), amido (e.g., acetamido, butylamido, hexylamido, laurylamido), and a non-aromatic heterocyclic group (e.g., morpholino, pyrazinyl).

Preferred substituent groups of the substituted aryl or substituted aromatic heterocyclic group are: a halogen atom, cyano, carboxyl, hydroxyl, amino, alkylsubstituted amino, acyl, acyloxy, amido, alkoxycarbonyl, alkoxy, alkylthio and an alkyl group.

The alkyl group and the alkyl moiety of the alkylamino group, the alkoxycarbonyl group, the alkoxy group or the alkylthio group may further have a substituent group. Examples of the substituent group of the alkyl group or moiety include: a halogen atom, hydroxyl, carboxyl, cyano, amino, alkylamino, nitro, sulfo, carbamoyl, an alkylcarbamoyl group, sulfamoyl, an alkylsulfamoyl group, ureido, an alkylureido group, an alkenyl group, an alkynyl group, an acyl group, an acyloxy group, an alkoxy group, an aryloxy group, an alkoxycarbonyl group, an aryloxycarbonyl group, an alkoxycarbonylamino group, an alkylthio group, an arylthio group, an alkylsulfonyl group, an amido group, and a non-aromatic heterocyclic group. Preferred substituent groups of the alkyl group or moiety are: a halogen atom, hydroxyl, amino, an alkylamino group, an acyl group, an acyloxy group, an acylamino group, an alkoxycarbonyl group, and an alkoxy group.

In Formula (C), $L^1$ is a divalent linking group selected from the group consisting of an alkylene group, an alkenylene group, an alkynylene group, a divalent saturated heterocyclic group, —O—, —CO— and combinations thereof.

The alkylene group may have a cyclic structure. As the cyclic alkylene group, cyclohexylene is preferred and 1,4-cyclohexylene is specifically preferred. If the alkylene group has a chain structure, a straight chain structure is preferred to a branched one.

The alkylene group has preferably 1 to 20 carbon atoms, more preferably 1 to 15 carbon atoms, further more preferably 1 to 10 carbon atoms, specifically more preferably 1 to 8 carbon atoms, most preferably 1 to 6 carbon atoms.

The alkenylene group or the alkynylene group preferably has a chain structure, more preferably a straight chain structure.

The alkenylene group or the alkynylene group has preferably 2 to 10 carbon atoms, more preferably 2 to 8 carbon atoms, further more preferably 2 to 6 carbon atoms, specifically more preferably 2 to 4 carbon atoms, most preferably 2 carbon atoms (namely, the alkenylene group or the alkynylene group is most preferably vinylene or ethynylene, respectively).

Examples of the combined divalent linking group are shown below.

L-1: —O—CO-alkylene-CO—O—
L-2: —CO—O-alkylene-O—CO
L-3: —O—CO-alkenylene-CO—O—
L-4: —CO—O-alkenylene-O—CO—
L-5: —O—CO-alkynylene-CO—O—
L-6: —CO—O-alkynylene-O—CO—

In the molecular structure represented by Formula (C), the angle between $Ar^1$—$L^1$ and $L^1$—$Ar^2$ is preferably 140° or more.

The rod-like compound is more preferably represented by Formula (D):

$$Ar^1\text{—}L^2\text{—}X\text{—}L^3\text{—}Ar^2. \qquad \text{Formula (D)}$$

In Formula (D), each of $Ar^1$ and $Ar^2$ is independently an aromatic group. The definition and examples of the aromatic group are the same as those of $Ar^1$ and $Ar^2$ in Formula (C).

In Formula (D), each of $L^2$ and $L^3$ is independently a divalent linking group selected from the group consisting of an alkylene group, —O—, —CO— and combinations thereof.

The alkylene group preferably has a chain structure, and a straight chain structure is preferred to a branched one.

The alkylene group has preferably 1 to 10 carbon atoms, more preferably 1 to 8 carbon atoms, further preferably 1 to 6 carbon atoms, specifically more preferably 1 to 4 carbon atoms, and most preferably 1 to 2 carbon atoms (namely, the alkylene group is most preferably methylene or ethylene).

Each of $L^2$ and $L^3$ is specifically preferably —O—CO— or —CO—O—.

In Formula (D), X is 1,4-cyclohexylene, vinylene or ethynylene.

Examples of the compound represented by Formula (C) including 1,4-cyclohexanedicarboxylic acid diphenylester derivatives are as follows.

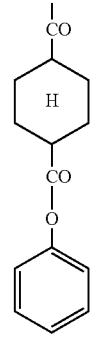

(R-1)

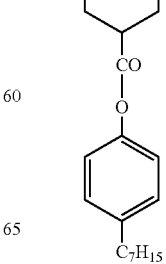

(R-2)

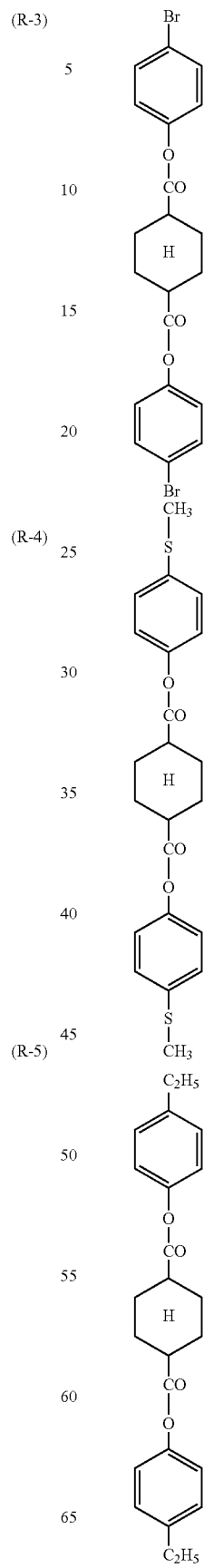

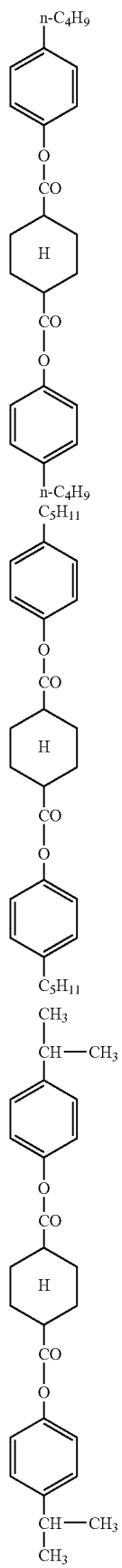
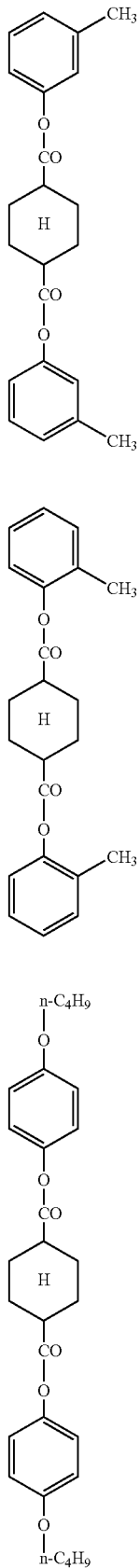

-continued
(R-15)
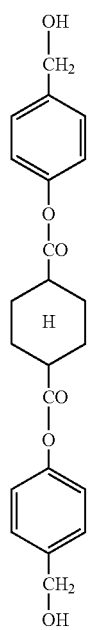
(R-17)
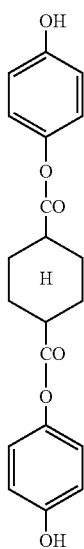
(R-16)
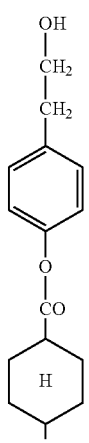
(R-18)
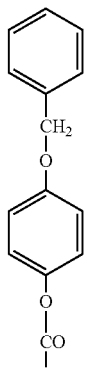
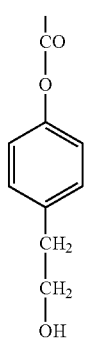

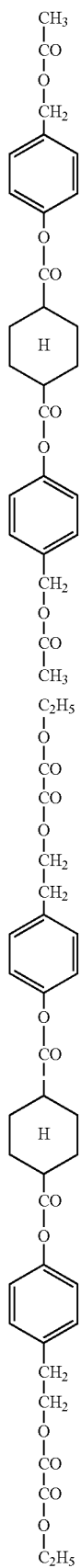
(R-19)
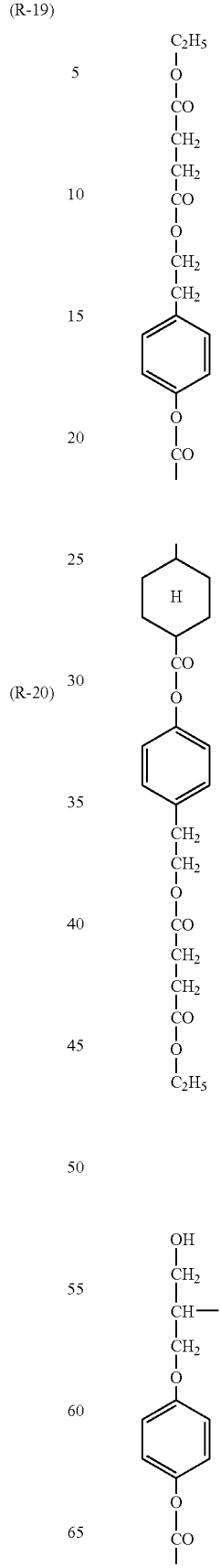
(R-20)
(R-21)
(R-22)

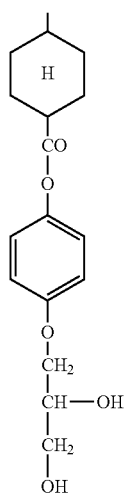
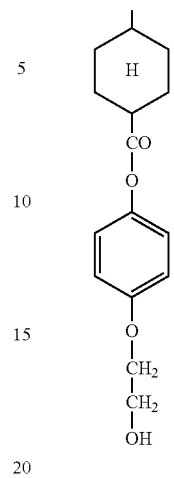
(R-23)
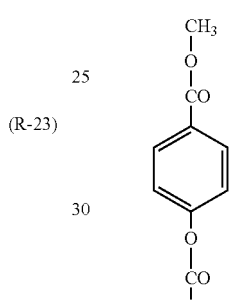
(R-25)
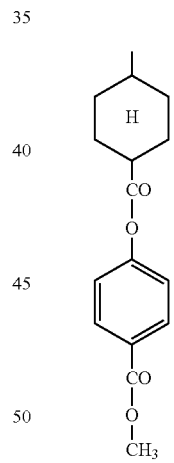
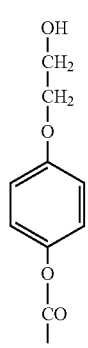
(R-24)
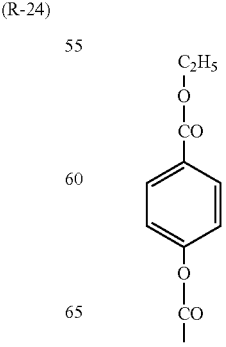
(R-26)

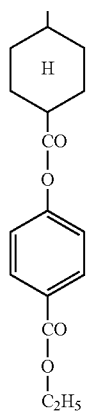
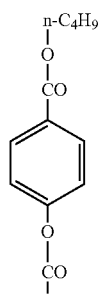
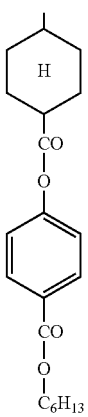
(R-27)
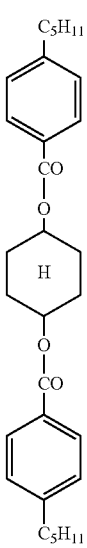
(R-29)
(R-28)
(R-30)
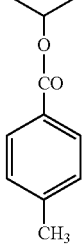

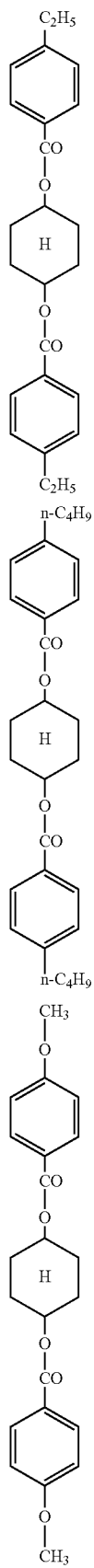
(R-31)
(R-32)
(R-33)
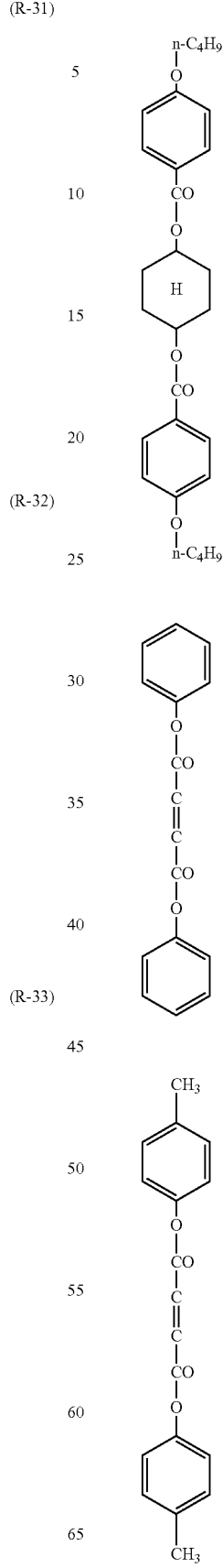
(R-34)
(R-35)
(R-36)

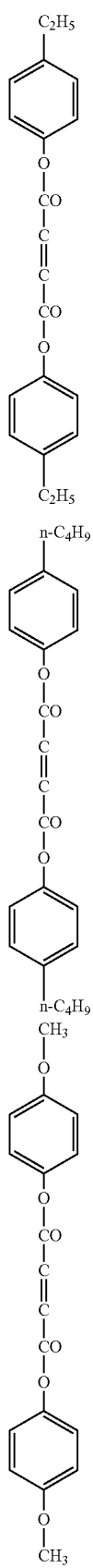
(R-37)
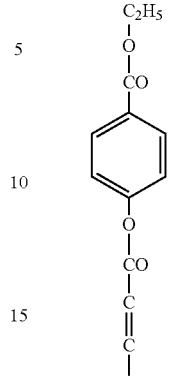
(R-38)
(R-39)
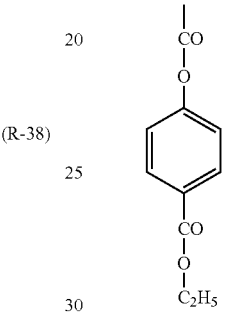
(R-40)
(R-41)
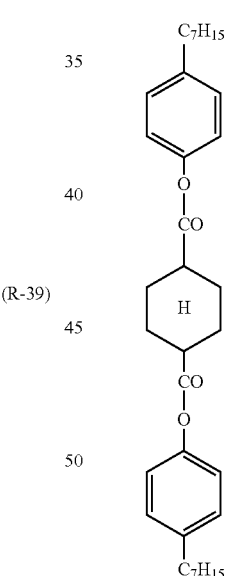
(R-42)
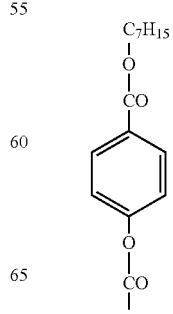

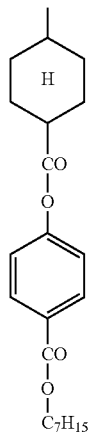

(R-43)

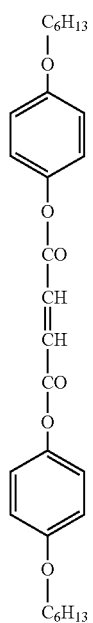

(R-44)

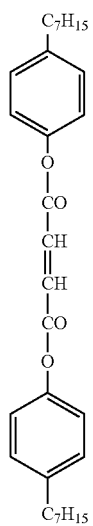

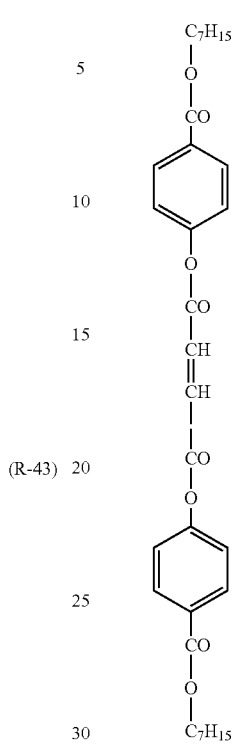

(R-45)

Each of the above (R-1) to (R-34), (R-41) and (R-42) has two asymmetric carbons at the 1- and 4-positions of cyclohexane ring. In spite of that, each compound of (R-1), (R-4) to (R-34), (R-41) and (R-42) has a symmetrical meso type-molecular structure, and hence has no optical isomer (optical activity) but geometrical isomers (trans and cis-forms). The trans-form (1-trans) and cis-form (1-cis) of the above compound (R-1) are shown below.

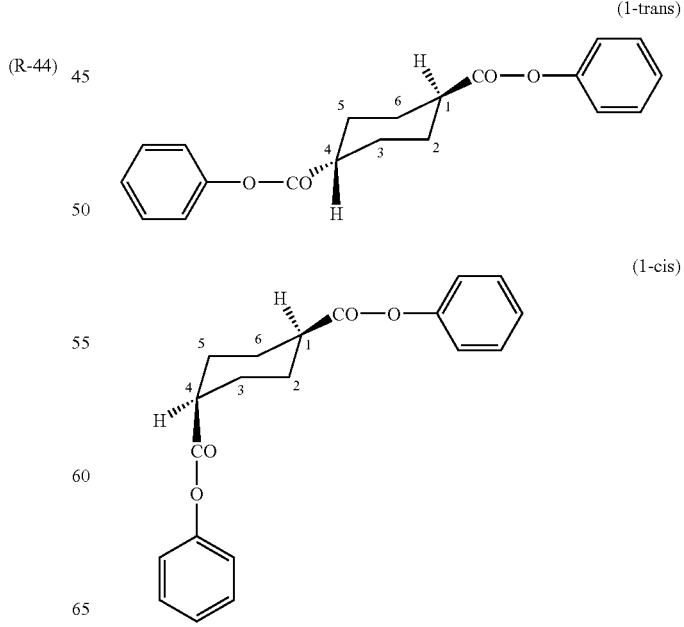

As described above, the rod-like compound preferably has a linear molecular structure. Accordingly, the trans-form is preferred to the cis-form.

Each of the above compounds (R-2) and (R-3) has not only geometrical isomers but also optical isomers (four isomers in total). With respect to the geometrical isomers, the trans-form is preferred to the cis-form. However, in view of the function, there is little difference among the optical isomers, and hence either D- or L-body may be used. Further, it may be racemate.

Each compound of (R-43) to (R-45) has trans- and cis-forms in connection with a vinylene bond at the central position. For the above-described reason, the trans-form is preferred to the cis-form.

Each compound of (R-10), (R-29) and (R-41) in the trans-form exhibits the maximum absorption peak at the following wavelength ($\lambda$max) in the ultraviolet absorption spectrum of its solution. The molar absorption coefficient ($\epsilon$) of each compound is also shown below.

R-10-trans: $\lambda$max=220 (nm), $\epsilon$=15,000;
R-29-trans: $\lambda$max=240 (nm), $\epsilon$=20,000; and
R-41-trans: $\lambda$max=230 (nm), $\epsilon$=16,000.

Two or more of the rod-like compounds, each of which gives the maximum absorption peak at a wavelength ($\lambda$max) shorter than 250 nm in its ultraviolet absorption spectrum in the form of solution, may be used in combination.

The rod-like compound can be prepared according to the methods described in, for example, Mol. Cryst. Liq. Cryst., 53(1979), pp. 229; ibid., 89(1982), pp. 93; ibid., 145(1987), pp. 111; ibid., 170(1989), pp. 43; J. Am. Chem. Soc., 113(1991), pp. 1349; ibid., 118(1996), pp. 5346; ibid., 92(1970), pp. 1582; J. Org. Chem., 40(1975), pp. 420; Tetrahedron, 48(1992), No. 16, pp. 3437; and JP-A No. 2004-51501.

(Dope Solution)

Organic solvents used for a dope, in which cellulose ester is dissolved, include chlorine based organic solvents and non-chlorine organic solvents. Methylene chloride which is-one of chlorine based organic solvents is suitable for dissolving cellulose ester, specifically cellulose acetate. A non-chlorine based organic solvent may also be used.

Examples of a non-chlorine based organic solvent include: methyl acetate, ethyl acetate, amyl acetate, acetone, tetrahydrofuran, 1,3-dioxolane, 1,4-dioxane, cyclohexanone, ethyl formate, 2,2,2-trifluoro ethanol, 2,2,3,3-tetrafluoro-1-propanol, 1,3-difluoro-2-propanol, 1,1,1,3,3,3-hexafluoro-2-methyl-2-propanol, 1,1,1,3,3,3-hexafluoro-2-propanol, 2,2,3,3,3-pentafluoro-1-propanol and nitroethane.

When these organic solvents are used to dissolve cellulose acetate, an ambient temperature dissolving technique is useful, however, an elevated temperature dissolving technique, a cooled solvent dissolving technique, and a high pressure dissolving technique are also preferable since the insoluble portion is reduced. Methylene chloride is preferably used, however, methyl acetate and ethyl acetate and acetone are also preferably used. Of these, methyl acetate is specifically preferable. Water is also used in a dope.

An organic solvent in which a cellulose ester is well dissolved is called "a good solvent". An organic solvent which mainly contributes for dissolution and mainly contained in a solution is called "a main organic solvent". "A good solvent" is defined as a solvent which dissolves not less than 5 g of cellulose ester in 100 g of the solvent at 25° C.

In a dope used in the present invention, 1 to 40% by weight of alcohol having a carbon number of 1 to 4 is preferably added in addition to the above described organic solvent. When alcohol is contained in a web, after casting a dope on a support and the solvent being partially evaporated from the web, the relative concentration of alcohol becomes higher and the web begins to gelate. The gelation increases the mechanical strength of the web and makes it easier to peel the web from the support. A smaller concentration of alcohol in a dope may contribute to increase a solubility of cellulose ester in a non-chlorine based organic solvent. Examples of an alcohol having a carbon number of 1 to 4 include: methanol, ethanol, n-propanol, iso-propanol, n-butanol, sec-butanol and tert-butanol. Among these alcohols, ethanol is specifically preferable, because ethanol is stable, having a low boiling point, being easy to evaporate and non-toxic. An alcohol is referred to as "a poor solvent" which is defined as a solvent dissolving not more than 5 g of cellulose ester in 100 g of the solvent at 25° C.

In order to maintain a high quality surface of a film, the concentration of cellulose ester is preferably 15 to 40% by weight, and the viscosity of a dope is preferably 10 to 50 Pa·s.

A dye or a matting agent may further be added in a dope. These additives may be added together with cellulose acetate and a solvent, or in preparation or after preparation of a dope.

(Plasticizer)

Film A and Film B used for the polarizing plate of the present invention preferably contain a compound known as a plasticizer in order to provide: (i) improved mechanical property; (ii) flexibility; (iii) water-resisting property; and (iv) lowered moisture permeability. For these purposes, phosphate ester derivatives and carboxylic acid ester derivatives are preferably used. The following polymers are also preferable: (i) a polymer prepared by polymerizing ethylene-based unsaturated monomers each having a weight average molecular weight of 500 to 10000 disclosed in JP-A 2003-12859; (ii) an acryl-based polymer; and (iii) an acryl-based polymer having an aromatic ring as a side chain.

Examples of a phosphate ester derivative include: triphenyl phosphate, tricresyl phosphate and phenyl diphenyl phosphate.

Examples of a carboxylate ester derivative include, phthalate ester and citrate ester. Examples of a phthalate ester derivative include: dimethyl phthalate, diethyl phthalate, dicyclohexyl phthalate, dioctyl phthalate and diethylhexyl phthalate. Examples of a citrate ester derivative include, acetyltriethyl citrate and acetyltributyl citrate.

Other examples include: butyl oleate, methylacetyl ricinoleate, dibutyl sebacate, triacetin, trimethylolpropane tribenzoate and alkylphthalyl alkylglycolate.

The alkyl group of alkylphthalyl alkylglycolate preferably has a carbon number of 1 to 8. Examples of an alkylphthalyl alkylglycolate include: methylphthalyl methylglycolate, ethylphthalyl ethylglycolate, propylphthalyl propylglycolate, butylphthalyl butylglycolate, octylphthalyl octylglycolate, methylphthalyl ethylglycolate, ethylphthalyl methylglycolate, ethylphthalyl propylglycolate, propylphthalyl ethylglycolate, methylphthalyl propylglycolate, methylphthalyl butylglycolate, ethylphthalyl butylglycolate, butylphthalyl methylglycolate, butylphthalyl ethylglycolate, propylphthalyl butylglycolate, Butylphthalyl propylglycolate, methylphthalyl octylglycolate, ethylphthalyl octylglycolate, octylphthalyl methyglycolate and octylphthalyl ethylglycolate. Of these, methylphthalyl methylglycolate, ethylphthalyl ethylglycolate, propylphthalyl propylglycolate, butylphthalyl butylglycolate and octylphthalyl octylglycolate are preferable, while ethylphthalyl ethylglycolate is specifically preferable. These alkylphthalyl alkylglycolates may also be used in combinations of two or more compounds.

The amount of a plasticizer added to a film is preferably in the range of not less than 0.5% by weight and less than 20% by weight based on a film weight, more preferably not less than 1% by weight and less than 11% by weight. The suitable amount of plasticizer is adjusted with respect to exhibition of desired effects and suppression of bleeding out. In order to suppress bleeding out, the vapor pressure of a plasticizer is preferably not more than 1333 Pa at 200° C.

(Stabilizer)

In a polymer film of the present invention, stabilizers (for example, an antioxidant, a peroxide scavenger, a radical scavenger, a metal deactivator, an acid scavenger or an amine) may be added. Examples of stabilizers have been disclosed in, for example, JP-A Nos. 3-199201, 5-1907073, 5-194789, 5-271471 and 6-107854. Among these, butylated hydroxytoluene (BHT) and tribenzylamine (TBA) are specifically preferable.

(Ultraviolet (UV) Absorber)

A UV absorber preferably has a superior absorbance in a wavelength range of 370 nm or less, in order to prevent deterioration of a polarizing element or a display under UV rays, and has a smaller absorbance in the visible light region at a wavelength range of 400 nm or more, in order to provide a superior image quality of a liquid crystal display. Examples of a UV absorber used in the present invention include: oxybenzophenone-based-compounds, benzotriazole-based compounds, salicylate-based compounds, benzophenone-based compounds, cyanoacrylate-based compounds and nickel complex-based compounds. Among these, benzophenone-based compounds and benzotriazole-based compounds, which exhibit negligible coloring, are specifically preferable. UV absorbers disclosed in JP-A Nos. 10-182621 and 8-337574, and a polymer UV absorber disclosed in JP-A No. 6-148430 are also preferable.

Specific examples of a preferable benzotriazole-based UV absorber include: 2-(2'-hydroxy-5'-methylphenyl) benzotriazole, 2-(2'-hydroxy-3',5'-di-tert-butylphenyl) benzotriazole, 2-(2'-hydroxy-3'-tert-butyl-5'-methylphenyl) benzotriazole, 2-(2'-hydroxy-3',5'-di-tert-butylphenyl)-5-chlorobenzotriazole, 2-(2'-hydroxy-3'-(3",4",5",6"-tetrahydrophthalimidomethyl)-5'-methylphenyl) benzotriazole, 2,2-methylenebis(4-(1,1,3,3-tetramethylbutyl)-6-(2H-benzotriazole-2-yl)phenol), 2-(2'-hydroxy-3'-tert-butyl-5'-methylphenyl)-5-chlorobenzotriazole, 2-(2H-benzotriazole-2-yl)-6-(normal chain and side chain dodecyl)-4-methylphenol, and a mixture of octyl-3-[3-tert-butyl-4-hydroxy-5-(chloro-2H-benzotriazole-2-yl)phenyl] propionate and 2-ethylhexyl-3-[3-tert-butyl-4-hydroxy-5-(5-chloro-2H-benzotriazole-2-yl) phenyl]propionate. However, the present invention is not limited thereto.

Commercially available Tinuvin 109, Tinuvin 171 and Tinuvin 326 (all produced by Ciba Specialty Chemicals Inc.) may also be preferably used.

Examples of benzophenone-based compounds include: 2,4-dihydroxybenzophenone, 2,2'-dihydroxy-4-methoxybenzophenone, 2-hydroxy-4-methoxy-5-sulfobenzophenone, and bis(2-methoxy-4-hydroxy-5-benzoylphenylmethane). However, the present invention is not limited thereto.

The method of adding an ultraviolet absorber, stabilizer, and a retardation increasing agent to the dope solution is not limited when the compounds are soluble in the solvent. However, in the present invention, a UV absorber is preferably preliminarily dissolved in, (i) a solvent which is a good solvent for a cellulose ester, for example, methylene chloride, methyl acetate, and dioxolane or (ii) a mixed solvent of a good solvent and a poor solvent, for example, a lower aliphatic alcohol (methanol, ethanol, propanol or butanol). A dope solution is prepared by mixing thus obtained stabilizer solution and a cellulose ester solution. A dope solution containing an stabilizer and a retardation increasing agent together with a UV absorber, depending on a purpose, may be prepared in the same manner as above described. In this method, the composition of a solvent used for preliminarily dissolving the additives is preferably similar to or the same as the composition of the solvent used for the dope.

(Matting Agent)

The cellulose ester film of the present invention may become easier to convey or to roll up by adding a matting agent to the cellulose ester film. A matting agent is preferably microparticles which are as minute as possible. Examples of microparticles include: (i) inorganic particles, for example, silicon dioxide, titanium dioxide, aluminum oxide, zirconium oxide, calcium carbonate, kaolin, talc, calcinated calcium silicate, hydrated calcium silicate, aluminum silicate, a magnesium silicate, and calcium phosphate; and (ii) crosslinked polymer particles, of these, silicon dioxide is specifically preferable because haze of the cellulose ester film may be decreased. Silicon dioxide particles the surface of which is treated with an organic substance is also preferable since haze of the film may be minimized.

Examples of a suitable organic compound used for surface treatment include: halosilanes, alkoxysilanes, silazane and siloxane. Microparticles with a larger mean particle diameter are preferable for improving slipping property, while a smaller mean particle diameter is preferable for improving transparency. The mean diameter of secondary particles are usually 0.05 to 1.0 μm, while the mean diameter of the primary particles is preferably 5 to 50 nm and more preferably 7 to 14 nm. The microparticles may be added to generate convexo-concave of 0.01 to 1.0 μm on the surface of a cellulose ester film. The content of microparticles in a cellulose ester film is preferably 0.005 to 0.3% by weight based on film weight.

Examples of microparticles of silicon dioxide include: Aerosil 200, 200V, 300, R972, R972V, R974, R202, R812, OX50 and TT600 (produced by Nippon Aerosil Co., Ltd.).

Specifically, Aerosil 200V, R972, R972V, R974, R202 and R812 are preferably used. The above particles may also be used in combinations in an arbitrary ratio. Microparticles differ in mean particle diameter or in material properties may also be used together, for example, Aerosil 200V and R972V may be used together in a mixing ratio of 0.1:99.9 to 99.9:0.1 as a weight ratio.

(2) Casting Process

In a casting process, a dope solution is sent to a high pressure die using a high pressure metering gear pump and cast on an endless metal belt, for example, a stainless steel belt, or on a rotating cylindrical metal support at a prescribed position from the high pressure die. The surface of the metal support is polished to a miller surface. As alternative casting methods, the following methods are listed: (i) a doctor blade method in which thickness of the cast dope is controlled by using a blade; and (ii) a reverse roll coat method in which thickness of the cast dope is controlled by a roll rotating in a reverse direction. However, the method using a high pressure die is preferable since uniform thickness is more easily obtained by adjusting the slit shape at the tip of a die. A high pressure die includes a coat-hanger die and a T die either of which are preferably used. Two high pressure dies may be provided simultaneously on a metal support to increase the film forming rate by dividing the amount of dope and by superimposing two film layers.

(3) Solvent Evaporation Process

A web (a film of a dope after the dope is cast on a metal support is referred to as a web) is heated on a metal support to evaporate the contained solvent until the web becomes peelable. The following methods may be used to promote evaporation of a solvent from a web: (i) blowing from above the web; (ii) heating a metal support from a back surface using a liquid heat medium; and (iii) heating from both surfaces of a web using radiant heat. Among these methods, the method to heat a metal support from a back surface using a liquid heat medium is preferable with respect to drying efficiency, however the above methods may also be used in combination.

In order to increase the formation rate of a web, a method to increase drying temperature is preferable, however, too high a temperature may cause foaming of the solvent in the web, accordingly, the preferable drying rate is prescribed depending on composition of the web. A method to cast a dope on a belt type metal support is also used to increase the formation rate of a web. A longer belt enables a higher forming rate of a web, however, a longer belt tends to bend while running and generate vibrations, which may cause uneven thickness of the web. Accordingly, the length of a belt is preferably 40 to 120 m.

(4) Peeling Process

A web dried on a metal support is peeled from the metal support at a prescribed position. The peeled web is sent to the next process. If the amount of the residual solvent in a web is too much at the point of peeling, peeling is difficult and if the amount of the residual solvent is too small, partial peeling of the web may occur prior to the point of peeling.

As an alternate method to increase the formation rate of a web, a gel casting method may be used. This method enables a higher forming rate of a web since a web is peeled while the web still contains a high percentage of solvent.

In a gel casting method, the gel is formed by: (i) adding a considerable amount of a poor solvent in a dope which forms a gel after casting the dope on a metal support; or (ii) lowering the temperature of the metal support to facilitate formation of a gel. By forming a gel, the mechanical strength of a web increases and an early peeling of the web becomes possible, resulting in a higher web formation rate.

In the present invention, the temperature at the point of peeling from the metal support is preferably controlled between 10° C.–40° C., and is more preferably 15° C.–30° C. The amount of residual solvent at the point of peeling on the metal support is preferably 30 to 120% by weight. The amount of the residual solvent is defined by the following equation:

Residual solvent content (% by weight)={(M−N)/N}×100 where M represents weight of samples of the web taken during or after the manufacturing process, and N represents weight of the same sample after it has been dried at 115° C. for one hour.

In a casting process using a belt support, an increase in the speed of a belt may result in a greater vibration of the belt. The film forming rate is preferably 10 to 120 m/minute, and more preferably 15 to 60 m/minute.

In the present invention, an amount of residual solvent is referred to as an average amount of residual solvent, however, sometimes the amount of residual solvent is localized, for example, an amount of residual solvent in a central area or in a edge area.

(5) Drying Process

The peeled web is generally dried by passing through many rolls provided in a staggered array, or using a tenter in which both edges of the web are clipped while the web is being conveyed. A general method of drying is to blow hot air on both surfaces of the web, however, a method to apply microwave is also possible. Too fast drying rate tends to result in loss of flatness of a web in the final stages of production. Usually, drying is carried out between 30 and 250° C. Drying temperature, amount of airflow, and drying duration depend on the type of solvent used in the web. Drying conditions may be appropriately selected depending on the type or the combination of solvent.

In the present invention, the process in which a cast film is peeled and transferred to a tenter may be called as a D0 process. In the D0 process, temperature is preferably controlled to optimize the amount of residual solvent in the web in a stretching process. Generally, stretching a web in the machine direction (the conveying direction or the longitudinal direction) is rather difficult, and is largely dependent on the amount of its residual solvent. The temperature in D0 process is preferably 20 to 80° C., more preferably, 20 to 70° C., and further more preferably 20 to 50° C. to optimize the amount of residual solvent in the web.

In the D0 process, the distribution of environmental temperature in the transverse direction (lateral direction) of a web is preferably small in order to improve uniformity of a web. The temperature distribution in the D0 process is preferably within ±5° C., more preferably within ±2° C., and further more preferably within ±1° C.

The preferable condition to minimize undesired stretching of the web during the peeling process or the D0 process is described in the following section.

The tension of the web in the D0 process is affected by: (i) property of the dope; (ii) amount of residual solvent in the web during a peeling process or in the D0 process; and (iii) the temperature of the D0 process. The tension in the D0 process in preferably 30 to 300 N/m, more preferably 57 to 284 N/m, and further more preferably 57–170 N/m. An additional roll which reduces the tension of a web is preferable to prevent stretching of the web in the machine direction during the D0 process, while the web is being conveyed. The preferable range of ratio between a good solvent and a poor solvent is one which prevents stretching of the web while it is conveyed. That ratio (amount of poor solvent)/(amount of sum of good and poor solvent)×100 (%) is preferably 95 to 15% by weight, more preferably 95 to 25% by weight, and further more preferably 95 to 30% by weight, at the final stage of the D0 process.

(6) Stretching Process

The stretching process (also referred to as the tenter process) of the present invention will now be explained using FIG. 2.

Figure 2:
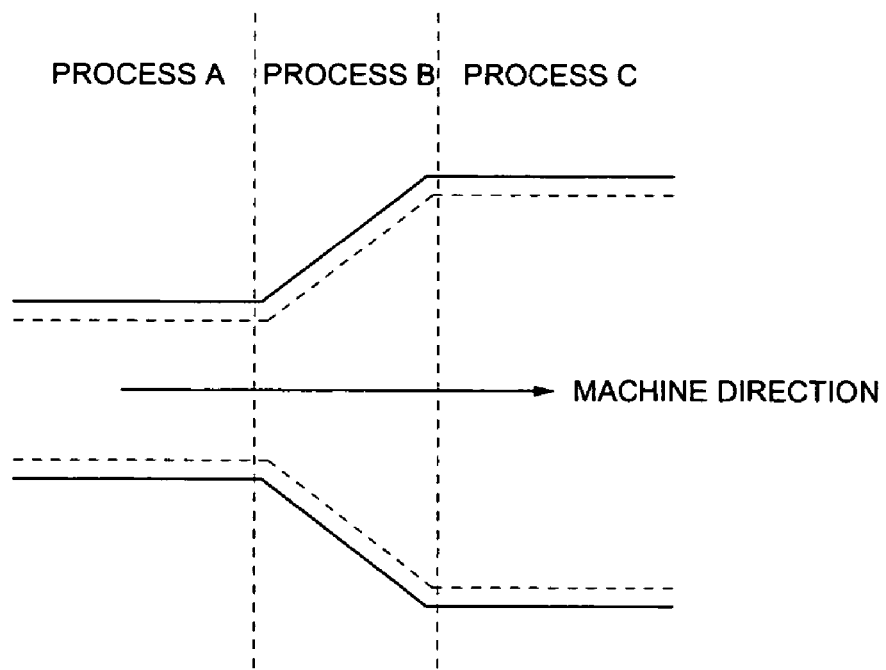
FIG. 2 is a schematic diagram explaining a tenter process.

Process A of FIG. 2 is one where a film (web) conveyed from the D0 process (not illustrated) is held by clipping. In Process B, the film is stretched in the transverse direction (the lateral direction) with the stretching angle illustrated in FIG. 1 (to be explained later). In Process C, stretching is completed and the film is conveyed to the next production step while being clipped.

A slitter which trims both edges of the film is preferably provided at any position between just after the web is peeled and just after Process B or C. Specifically preferably, a slitter is provided just before Process A. When a stretching was carried out under the same condition, a stretched film which is slit before Process B showed an improved orientation angle distribution of slow axes than a stretched film without slitting.

This may be because an undesirable stretching in the machine direction is suppressed between the peeling process and Process B where the film still contains much solvent.

In a tenter process, different temperature domains may be purposely provided in the film to improve the orientation angle distribution of slow axes. Also a neutral domain is preferably provided between two different temperature domains to prevent interference.

The stretching process may be divided into several steps. Biaxial stretching in both machine and transverse directions is also preferable. Biaxial stretching may be carried out simultaneously or in series of steps. In stepped stretching, stretching may be carried out in different directions or in the same direction. Stretching in different directions may also be added to the sequence of stepped stretching in the same direction. The following stretching steps may be possible.

(1) stretching in the machine direction—transverse direction—machine direction—transverse direction;

(2) stretching in the transverse direction—transverse direction—machine direction—machine direction.

The term "end of stretching" indicates the moment in the final stage of the stretching process where an in-plane retardation value (Ro) attains at 15 nm or more per 100 μm of dry thickness of the film by stretching. The following stretching cases are not designated as the "stretching" at the "end of stretching": (i) stretching while a film is conveyed; or (ii) a substantial stretching which occurs when a film shrinks by drying while width of the film is kept constant by clipping both edges. Because, in these cases, the stretch does not contribute to the appearance of the above described in-plane retardation value (Ro) of 15 nm or more which was generated by the tenter stretching.

The term "stretching direction" is usually used to indicate the direction in which a direct stretching stress is applied to a film (expression 1), however, in a case of stepped biaxial stretching, "stretching direction" may indicate the direction in which the final stretching factor is the largest (expression 2), which is usually identical to the direction of a slow axis.

When a changing rate of a film dimension is discussed, the term "stretching direction" without explanation may be used in the meaning of above expression 2, and when an amount of residual solvent is discussed, the term is usually used in the meaning of above expression 1.

In order to improve dimensional stability of a stretched film after it is subjected to a high temperature—high humidity test (hereafter denoted as a 80° C.—90% RH test), stretching is preferably carried out while the film is heated and while the film still contains a residual solvent. The following tendency has been found in the present invention with respect to dimensional stability of the film in the stretching direction (or lateral direction when the slow axis of the film lies in the lateral direction), and dimensional stability of the film in a direction perpendicular to the stretching direction, when the film is subjected to a 80° C.—90% RH test: (i) The dimensional stability of the film in the stretching direction in a 80° C.—90% RH test depends relatively largely on the amount of residual solvent while dependency on stretching temperature is relatively small; and (ii) The dimensional stability of the film in the direction perpendicular to the stretching direction in a 80° C.—90% RH test depends relatively largely on the stretching temperature while dependency on the amount of residual solvent is relatively small. Here, the stretching temperature represents a temperature of the circumstance of the stretching process and the temperature of the film is increased to almost the same temperature as the stretching temperature (temperature of the circumstance) at the end of stretching process. The optimization of stretching conditions with respect to temperature and the amount of residual solvent was found to affect more largely on an improvement in dimensional stability in a 80° C.—90% RH test in the stretching direction than on an improvement in the dimensional stability in direction perpendicular to the stretching angle.

Shown below are specific examples of a dimensional stability in a 80° C.—90% RH test measured for a cellulose ester film having an Ro value of 40 to 50 nm and a thickness of 80 μm, the cellulose ester film being obtained in an in-line stretching process in which stretching is subsequently carried out after casting:

(i) a dimensional stability in the machine direction (MD) of within ±1.0% was observed 100 hours after a 80° C.—90% RH test for a film prepared under the following conditions: the stretching temperature was 120° C. or more, and the amount of residual solvent at the end of stretching was 7% or more;

(ii) a dimensional stability in the TD direction of within ±0.5% was obtained 100 hours after a 80° C.—90% RH test for a film prepared under the following conditions: the stretching temperature was 110° C. or more, and the amount of residual solvent at the end of stretching was 12% or more; and (iii) a dimensional stability of within ±1.5% in the MD direction and within ±1.0% in the TD direction was observed 100 hours after a 80° C.—90% RH test for a film prepared under the following conditions: the stretching temperature was 100° C. or more, and the amount of residual solvent at the end stretching was 12% or more.

The more preferable examples of a dimensional stability of the above mentioned cellulose ester film are as follows:

(iv) a dimensional stability of within ±1.0% in the MD direction and within ±0.5% in the TD direction was observed 100 hours after a 80° C.—90% RH test for a film prepared under the following conditions: the stretching temperature was 120° C. or more, and the amount of residual solvent at the end of stretching was 7% or more; and (v) a dimensional stability of within ±0.7% in the MD direction and within ±0.2% in the TD direction was observed 100 hours after a 80° C.—90% RH test for a film prepared under the following conditions: the stretching temperature was 130° C. or more, and the amount of residual solvent at the end of stretching was 12% or more.

In the tenter process, the formula Ma>Mc is preferably satisfied and also Mb>Mc is preferably satisfied, wherein Ma, Mb and Mc represent concentrations of a good solvent in Processes A, B and C, respectively.

There no specific limitation on the amount of residual solvent in the film at each end of Processes A, B and C, however, there exist a preferable ratio of a good solvent to a poor solvent. The concentration of (amount of poor solvent)/(amount of sum of good and poor solvents)×100 (%) at each end of Processes A, B and C is preferably 95 to 15% by weight, more 95 to 25% by weight, and further more preferably 95 to 30% by weight. The concentration of (amount of poor solvent)/(amount of sum of good and poor solvents)×100 (%) at each end of Processes A, B and C may be the same or different from each other.

It is well known that, when a film is stretched in the transverse direction of the film, the dispersion of orientations of slow axes (hereafter referred to as a orientation angle dispersion) becomes larger. In order to conduct stretching in the transverse direction of a film while the ratio of Rth to Ro is kept constant and the orientation angle dispersion is kept small, a film preferably satisfies Ta≦(Tb−10), or Tc≦Tb, and more preferably the film satisfies both Ta≦(Tb−10) and Tc≦Tb, wherein Ta, Tb and Tc each represents a temperatures in Celsius at each end of Processes A, B and C, respectively.

In order to decrease the above mentioned orientation angle dispersion, the temperature increasing rate of the film in Process B is preferably 0.5 to 10° C./s.

The stretching duration in Process B is preferably shorter to increase a dimensional stability in the 80° C.—90% RH test, however, a lower limitation of the stretching duration may be prescribed to maintain uniformity of the film. The stretching duration is preferably 1 to 10 seconds, more preferably 4 to 10 seconds.

In the tenter process, a coefficient of heat transfer may be constant or may be changed. The heat transfer coefficient is preferably in the range of $41.9 \times 10^3$ to $419 \times 10^3$ J/m²hr, more preferably $41.9 \times 10^3$ to $209.5 \times 10^3$ J/m²hr, and further more preferably $41.9 \times 10^3$ to $126 \times 10^3$ J/m²hr.

In order to improve the dimensional stability of a film in the 80° C.—90% RH test, the stretching rate in the transverse direction in Process B may be constant or may be changed. The stretching rate is preferably in the range of 50 to 500%/minute, more preferably 100 to 400%/minute, and most preferably 200 to 300%/minute.

In the tenter process, the distribution of environmental temperature is preferably smaller to improve uniformity of a film. The distribution of environmental temperature in the tenter process is preferably within ±5° C., more preferably within ±2° C., and most preferably within ±1° C. By decreasing the distribution of environmental temperature, the temperature distribution in the transverse direction of a film may also be decreased.

In Process C, in order to suppress further stretching, the width of a film held by a tenter is preferably reduced. Specifically, the width is preferably reduced to 95 to 99.5% of the former process.

After a film is treated in the tenter process, a subsequent-drying process (hereafter referred to as Process D1) is preferably provided. In order to refine the optical property provided to the film in the tenter process and to further dry the film, the film is preferably subjected to a heat treatment in the temperature range of 50 to 140° C., more preferably, 80 to 140° C., and most preferably 80 to 130° C.

In order to refine the optical property provided to the film in the tenter process and to further dry the film, the film is preferably subjected to a heat treatment with the heat transfer coefficient of $20.9 \times 10^3$ to $126 \times 10^3$ J/m²hr, more preferably $41.9 \times 10^3$ to $126 \times 10^3$ J/m²hr, most preferably $41.9 \times 10^3$ to $83.7 \times 10^3$ J/m²hr.

In Process D1, the distribution of environmental temperature in the transverse direction on a film is preferably smaller to improve uniformity of a film. The distribution of environmental temperature in the transverse direction is preferably within ±5° C., more preferably within ±2° C., and most preferably within ±1° C.

Although the film tension while the film is being conveyed is affected by several factors, for example: the property of a dope, the amount of residual solvent at the peeling process and Process D0, and the temperature of Process D1, the film tension is preferably 120 to 200 N/m, more preferably 140 to 200 N/m, and most preferably 140 to 160 N/m.

In order to reduce further stretching in the machine direction of the film in Process D1, a tension cut roll (an additional roll which reduces the tension of the film while the film is conveyed) is preferably provided. Preferably conducted is the trimming of both edges of the film using a slitter after the drying is completed and before winding in a roll, to obtain a roll of the preferable shape.

In order to improve a display quality, a cellulose ester film is provided with an optical retardation property. The retardation value of the film is preferably controlled by the stretching in the transverse direction of the film.

The thickness of Film A of the present invention is preferably in the range of 20 to 100 μm, and more preferably 30 to 85 μm. The cellulose ester film having the thickness of this range provides a sufficient physical strength and a preferable productivity in addition to the property of improving image quality.

Film B of the present invention is produced by a flow casting method and used for a polarizing plate of the present invention. The thickness of Film B is preferably 30 to 150 μm and more preferably 40 to 120 μm. The cellulose ester film having a thickness of this range provides sufficient physical strength and preferable productivity in addition to the property of improving image quality.

(Polarizing Plate)

A polyvinyl alcohol film doped with iodine and then stretched is used as a polarizing element of the polarizing plate of the present invention. Film A/polarizing element film/Film B are laminated in that order to form a polarizing plate.

Film A and Film B of the present invention are preferably used also in a conventional polarizing plate to obtain an improved image quality of a display, which is an object of the present invention.

Film B of the present invention will now be explained.

In the stretching process of Film B, it is important to control the orientation angle distribution within a prescribed range while stretching the film in the transverse direction. An object of the present invention is more effectively attained by aligning slow axes of Film B in a certain range of an orientation angle.

The polarizing plate of the present invention is produced as a long rolled film, which is preferable with respect to the productivity of the film. Since each of the polarizing element, Film A and Film B is a rolled film, the production method of a polarizing plate known in the art may be applied the present invention.

The transmission axis of a roll film polarizing element is preferably lies in the direction perpendicular to the machine direction of the polarizing element with respect to mass production of a rolled polarizing plate film, because the slow axis of Film B lies in the same direction as the transmission axis of the polarizing element, provided that the direction of the slow axis is perpendicular to the machine direction of Film B.

Here, the orientation angle represents an angle between the direction of the slow axis in the plane of a cellulose ester film and the transverse direction of a flow cast rolled film. The orientation angle is determined using an automatic birefringence meter KOBRA-21ADH (manufactured by Oji Keisokukiki Co., Ltd.).

The orientation angle at any point over the entire width of the film preferably lies within ±2° of the average orientation angle based on all the measured points. The orientation angle is more preferably within ±1°, and most preferably within ±0.5° of the average orientation angle.

The distribution of in-plane retardation values (Ro) is preferably adjusted to be not more than 5%, more preferably not more than 2%, and specifically preferably not more than 1.5%. The distribution of out-of-plane retardation values in a thickness direction (Rth) is preferably adjusted to be not more than 10%, more preferably not more than 2%, and specifically preferably not more than 1.5%.

The above mentioned distribution of in-plane retardation values represents a coefficient of variation (CV) of retardation values measured every 1 cm in the transverse direction of the film. The distribution of retardation values is determined by obtaining a standard deviation of in-plane retardation values or out-of-plane retardation values, then, by calculating the coefficient of variation (CV) according to the following equation using an (n−1) method. The n value is preferably 130 to 140.

Coefficient of variation (CV) of retardation values=
(Standard deviation)/(Average of retardation values)

Film A and Film B of the present invention preferably have smaller CV values of retardation. When the polarizing plate of the present invention is used in a liquid crystal display, the CV value of retardation of Film B is preferably smaller in order to reduce color shading in a display.

Film B of a polarizing plate of the present invention may have a wavelength dependence of retardation value. When a polarizing plate of the present invention is used in a display, specifically in a liquid crystal display, a suitable wavelength dependence of retardation value may be appropriately selected. Now, the retardation values of Film B measured at wavelengths of 450, 590 and 650 nm are represented as $R_{450}$, Ro, and $R_{650}$, respectively.

When the polarizing plate of the present invention is used in a MVA mode liquid crystal display which will be explained later, the wavelength dependence of retardation value of Film B is preferably, $0.7<R_{450}/Ro<1.0$, $1.0<R_{650}/Ro<1.5$, more preferably $0.7<R_{450}/Ro<0.95$, $1.01<R_{650}/Ro<1.2$, and specifically preferably $0.8<R_{450}/Ro<0.93$, $1.02<R_{650}/Ro<1.1$, in order to obtain an preferable property in reproducing colors.

When a polarizing plate of the present invention is used in a display, specifically in a liquid crystal display, high transparency and high UV absorbance are required for Film A and Film B to obtain a bright image and to attain an object of the present invention. The transmittance of each of Films A and B containing above described additives measured at a wavelength of 500 nm is preferably 85 to 100%, more preferably 90 to 100%, and specifically preferably 92 to 100%. The transmittance of each of these films measured at 400 nm is preferably 40 to 100%, more preferably 50 to 100%, and specifically preferably 60 to 100%. The transmittance of each of these films measured at 380 nm is preferably 0 to 10%, more preferably 0 to 5%, and most preferably 0 to 3%.

Film A and Film B preferably exhibit high transparency, namely, high transmittance and low haze. The haze value is preferably not more than 2%, more preferably not more than 1.5%, and most preferably not more than 1%. The same preferable haze value is also required for a film stretched in the transverse direction.

Moisture permeability defined in JIS Z 208 is used in the present invention. The moisture permeability of each of Film A and Film B measured at 25° C. under 90% RH is preferably 10 to 250 g/m²·24 hours, more preferably 20 to 200 g/m²·24 hours, and most preferably 50 to 180 g/m²·24 hours.

Figure 3:
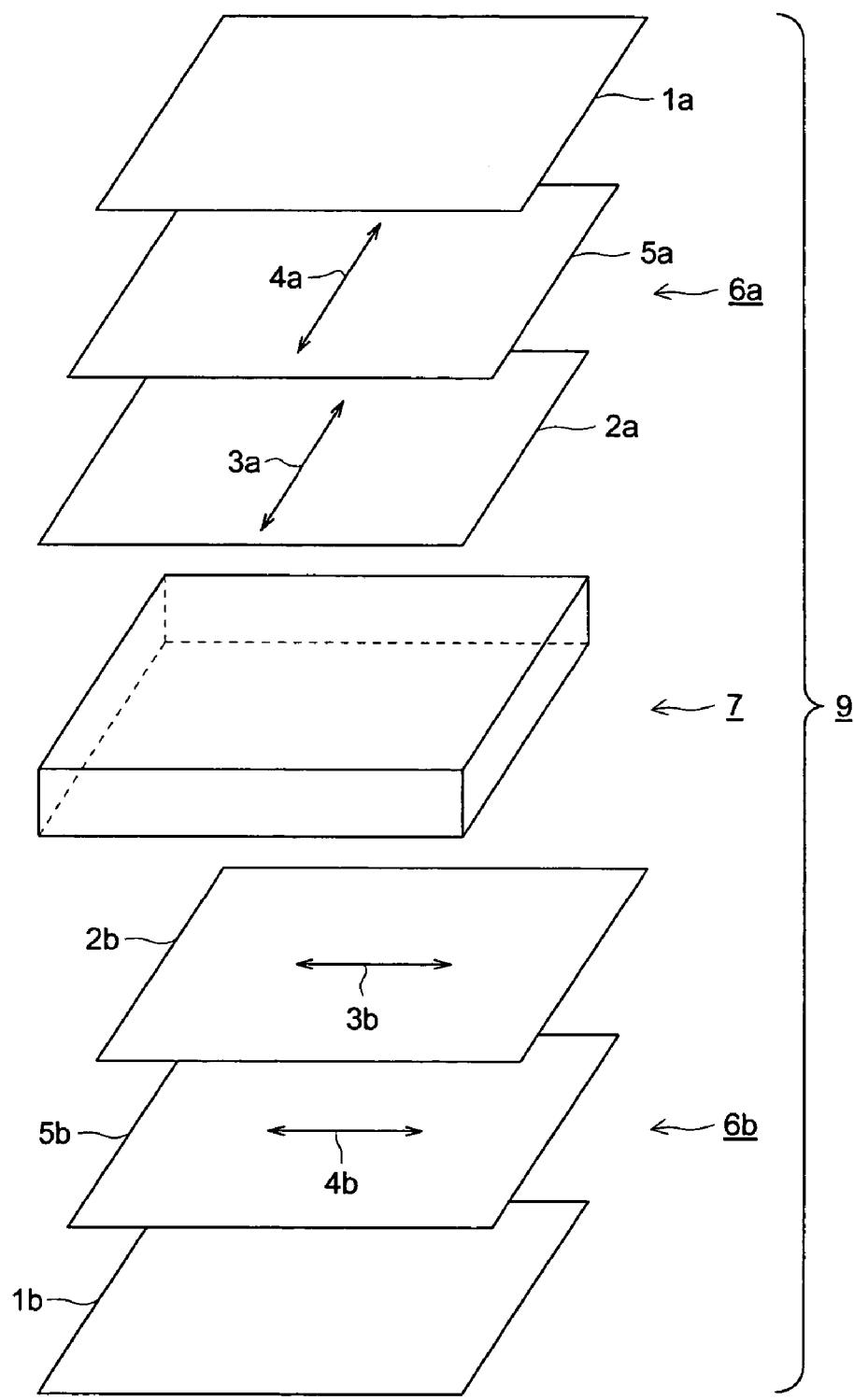
FIG. 3 is a schematic diagram showing the construction of a liquid crystal display of the present invention.

When the polarizing plate of the present invention is used in a display, specifically in a liquid crystal display, two polarizing plates of the present invention are provided on both surfaces of a liquid crystal cell. These two polarizing plates may be same or different. A display having one polarizing plate of the present invention on one surface of a liquid crystal cell may attain an object of the present invention, however, more preferably two of the polarizing plates sandwiches a liquid crystal cell, as shown in FIG. 3, which is a schematic illustration of the construction of the display of the present invention. The preferable stacking order of each film to attain an object of the present invention is as follows:

Polarizing plate 1 (Film A1/Polarizing element/Film B1)/Liquid crystal cell/Polarizing plate 2 (Film B2/Polarizing element/Film A2)

where (i) a transmission axis of Polarizing Plate 1 is orthogonal to a transmission axis of Polarizing Plate 2; (ii) Film B1 and Film B2 are essentially the same; and (iii) a slow axis of each of Film B1 and Film B2 is almost parallel to the transmission axis of the adjacent polarizing element. A polarizing plate thus prepared effectively improves the image quality of a display.

Film A1 and Film A2 are both included in Film A, and they may be the same or may be different from each other. Also, Film B1 and Film B2 are both included in Film B, and they may be the same or different and preferably they are the same.

(Display)

The present invention is more effectively employed in a liquid crystal display, specifically in a Multi-domain mode liquid crystal display, and more preferably in a birefringent multi domain liquid crystal display.

A multi domain mode is also suitable for improving symmetry of an image and various method have been reported. For example: "Okita, and Yamauchi, Liquid Crystal, 6(3), 303 (2002)". The liquid crystal cell has also been introduced, for example, in "Yamada, and Yamahara, Liquid Crystal, 7(2), 184 (2003)", however, the present invention is not limited thereto.

The present invention may be effectively employed in the liquid crystal displays of the following modes, for example: (i) a MVA (Multi-domain Vertical Alignment) mode which is one of typical examples of the vertical alignment mode, specifically a 4-domain MVA mode; (ii) a PVA (Patterned Vertical Alignment) mode which is multi-domained by patterned electrodes; and (iii) a CPA (Continuous Pinwheel Alignment) mode in which a Chiral force and patterned electrodes are merged. Use of an optically biaxial film in an OCB (Optically Compensated Bend) mode has been proposed in "T. Miyashita, T. Uchida, J. SID, 3(1), 29 (1995)" in which the polarizing plate of the present invention may be employed to exhibit the effect of the present invention, namely, an improvement of image quality. The order of stacking of polarizing plates and the type of liquid crystal mode is not limited, provided that the effect of the present invention is obtained by using the polarizing plate of the present invention.

The image of a display is preferably symmetrical when observed. Accordingly, formation of multi-domain may be carried out while giving priority in keeping symmetry on the observation side of the display. Multi-domain formation is carried out using a method known in the prior art and the number of divided domains, for example, two or four may be determined depending on the properties of each liquid crystal mode.

Liquid crystal displays have been used as color displays and as moving picture displays. The improvement in image quality attained by the present invention enables displaying a moving picture without eye strain while giving real images due to the improved contrast and the improved durability of the polarizing plate. In a display lacking in durability, additives used to obtain desired optical properties tends to separate. And, further, polarizing ability may be degraded by irradiation of light, specifically, of UV rays. Reduction of transmittance, generation of bright spots, or degradation of polarizing ability occurring in a polarizing plate may cause eye strain or unpleasant sensation to the image while watching a moving picture.

Another functional sheet may further be provided on Film A or, depending on a purpose, on Film B.

Examples of the above functional sheet include: an antireflective, antiglare, antiscratching, antidust, and brightness-enhancing sheet. Each of these functional sheets may be included in a composite-functional sheet, known in the art, or may be laminated onto the polarizing plate of the present invention. However, the present invention is not limited thereto.

EXAMPLES

The present invention will now be explained using the following examples, however, the present invention is not limited thereto.

First of all, measuring methods of various properties will be described.

(Measurement of Degree of Acetyl Substitution and Acetylation Degree of Cellulose Ester Film)

The degree of acetyl substitution (DSa) of a cellulose ester film was measured according to ASTM-D817-96. DSa represents a number of hydroxyl groups substituted by acetyl groups in a glucose unit of a cellulose ester, accordingly DSa is in the range of 0 to 3.

The acetylation degree represents weight percent of introduced acetic acid based on a weight of a cellulose ester and calculated according to the following equation.

(Acetylation degree (%))=($DSa$×(Mw of CH$_3$COOH))×100/((Mw of C$_6$H$_{10}$O$_5$)+($DSa$×(Mw of CH$_2$CO)))

where Mw stands for molecular weight.

(Ro, Rth)

The average refractive index of film construction materials was measured using an Abbe refractometer (4T). Film thickness was measured using a slide caliper.

A retardation value of a film was measured at 23° C. under a humidity of 55% RH by using an automatic birefringence meter KOBRA-21ADH (manufactured by Oji Keisokukiki Co., Ltd.) at a wavelength of 590 nm, after the film was left for 24 hours under the same conditions as the measurement. Using the average refractive index and the film thickness described above, an in-plane retardation value (Ro) and an out-of plane retardation value in the thickness direction (Rth) were determined. Simultaneously, direction of a slow axis was also determined.

(Viewing Angle Property)

Evaluation of the viewing angle property was carried out by measuring the contrast which is the ratio of transmittance (white display)/(black display), using EZ-contrast (produced by ELDIM).

Example 1

(Film A)

(Film A-101)

| (Preparation of Dope Solution D-101) | |
|---|---|
| Cellulose ester (an average acetylation degree of 60.1%) | 100 weight parts |
| Triphenyl phosphate | 9.5 weight parts |
| Ethylphthalyl ethylglycolate | 2.2 weight parts |
| Methylene chloride | 440 weight parts |
| Ethanol | 40 weight parts |

The above materials were placed in a sealed vessel and well dissolved by heating and stirring the mixture. The resulting solution was filtered using a filter paper No. 24, manufactured by Azumi Filter Paper Co. Ltd., to form Dope D-101. A portion of Dope D-101 was also used to prepare in-line additive solution IN-101. In the production line of the cellulose ester film, a filter, Finemet NF (produced by Nippon Seisen Co., Ltd.) was used to filter Dope D-101.

| (Preparation of Silicon Dioxide Dispersed Solution B) | |
|---|---|
| Aerosil 200 V (produced by Nippon Aerosil Co., Ltd.) (The average primary particles diameter of 12 nm, and an apparent specific gravity of 100 g/liter) | 2 weight parts |
| Ethanol | 18 weight parts |

The above materials were mixed and stirred for 30 minutes using a dissolver, followed by dispersing with Mantongorin. Silicon Dioxide Dispersed Solution B was thus obtained. The turbidity of the liquid after the dispersion was 100 ppm. 18 weight parts of methylene chloride was added to the Silicon Dioxide Dispersed Solution B while the solution was being stirred, followed by further stirring for 30 minutes with a dissolver, to prepare a diluted silicon dioxide dispersed solution.

| (Preparation of In-line Additive Solution IN-101) | |
|---|---|
| Methylene chloride | 100 weight parts |
| Dope D-101 | 34 weight parts |
| Tinuvin 109 (produced by Ciba Specialty Chemicals Inc.) | 5 weight parts |
| Tinuvin 171 (produced by Ciba Specialty Chemicals Inc.) | 5 weight parts |
| Tinuvin 326 (produced by Ciba Specialty Chemicals Inc.) | 3 weight parts |

The above materials were placed in a sealed reaction vessel and well dissolved by heating and stirring, followed by filtering.

In the resulting solution, 20 weights parts of the above described diluted silicon dioxide dispersed solution was added while the solution was being stirred, further stirred for 60 minutes and filtered with polypropylen wound cartridge filter TCW-PPS-1N manufactured by Advantec Toyo Kaisha, Ltd. to prepare In-line additive solution IN-101.

In a film forming line, In-line Additive Solution IN-101 was filtered with Finemet NF (produced by Nippon Seisen Co., Ltd.). 2.5 weight parts of filtered In-Line Additive Solution IN-101 was added to 100 weight parts of filtered Dope D-101. The mixture was well stirred using an in-line mixer (Hi-Mixer, SWJ produced by Toray Corp.) and cast onto 1800 mm wide stainless steel belt support, at 35° C. The solvent in the formed web was evaporated until the residual amount of solvent decreased to 100%, and the web was peeled from the support. The web was further dried at 35° C. and trimmed by a pair of slitters to a width of 1650 mm. Then, the web was further dried at 130° C. while the web was stretched to a factor of 1.1 using a tenter in the TD direction (transverse direction which is perpendicular to the conveyance of the film). The amount of residual solvent in the film was 20% when the tenter stretching was started. The web was further passed through drying zones of 120° C. and 110° C. to finalize drying. The film was conveyed using many rollers. Then, the web was slit to 1400 mm, and both edges of the web were subjected to a knurling treatment of 15 mm width and 10 mm height and rolled onto a core to obtain Film A-101. The amount of residual solvent just after production of Film A-101 was 0.1%. The final film thickness was 80 μm and the length of the film was 4000 m.

(Preparation of Film 102–Film 108)

Films 102 to 108 were prepared in the same manner as Film 101 except that: (i) acetylation degree; (ii) amounts of added Tinuvin 109, Tinuvin 171, Tinuvin 326, an stabilizer and a retardation increasing agent; and (iii) film thicknesses, were changed as listed in Table 1. For Film 105, all of Tinuvin 109, 171 and 326 as a UV absorber were exchanged to 2-hydroxy-4-benzyloxybenzophenone as shown in Table 1. Each film was dried so that the amount of the residual solvent in the film just after production was not more than 0.1%.

A UV absorber, an stabilizer and a retardation increasing agent were separately extracted from each of Films 101 to 109 to determine the amount of each of these additives contained in 1 $m^2$ of each film by means of high-performance liquid chromatography, gas chromatography, and mass spectroscopy, and noting film thickness and weight of each film. Each determined value was also converted to a value of % by weight based on the weight of the film forming resin, which was cellulose acetate in the present invention. The amounts of a UV absorber (sum of all the compounds), an stabilizer and a retardation increasing agent contained in 1 $m^2$ of the film were listed in Table 1. The concentrations of plasticizer contained in Films 101 to 108 were also determined in the same way and found to be in the range of 10.2 to 10.8% by weight.

TABLE 1

| Film No. | Acetylation degree (%) | Film thickness (μm) | UV absorber (g/$m^2$) | Stabilizer* (g/$m^2$) | Retardation increasing agent** (g/$m^2$) |
| --- | --- | --- | --- | --- | --- |
| 101 | 60.1 | 80 | 1.2 | 0 | 0 |
| 102 | 60.1 | 80 | 1.2 | 0 | 0.1 |
| 103 | 60.1 | 80 | 1.2 | 0.11 | 0 |
| 104 | 60.1 | 80 | 2.0 | 0 | 1.2 |
| 105 | 60.1 | 80 | 1.2*** | 0 | 0 |
| 106 | 60.1 | 80 | 0 | 0 | 0 |
| 107 | 60.1 | 80 | 3.6 | 0 | 0 |
| 108 | 58.0 | 57 | 1.2 | 0 | 0 |

*tribenzylamine
**triazine derivative of the following structure
***2-hydroxy-4-benzyloxybenzophenone
Retardation Increasing agent

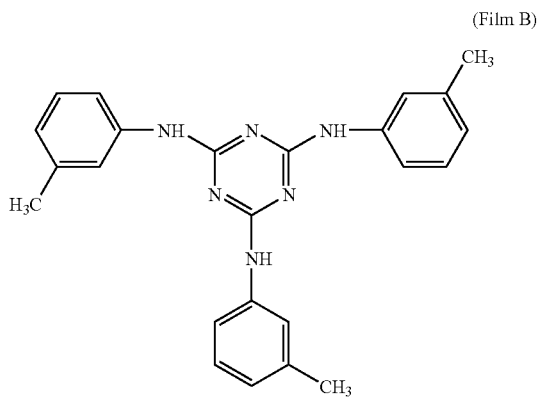

(Film B)

(Film B-201)

The process before casting a dope of Film B-201 was the same manner as that for Film A-101.

The dope of Film B-201 was uniformly cast onto a 1800 mm wide stainless steel belt support, at 35° C. The solvent in the formed web was evaporated until the residual amount of solvent decreased to 100%, after which the web was peeled from the support. The residual solvent of the web was further evaporated at 55° C. and slit to a width of 1650 mm. Then, the web was stretched by a factor of 1.3 using a tenter in the TD direction at 130° C. The amount of residual solvent in the film was 18% when tenter stretching was started. The web was further passed through 120° C. and 110° C. drying zones to finalize drying. The film was conveyed using many rollers. Then, the web was trimmed to 1400 mm, and both edges of the web was subjected to a knurling treatment of 15 mm width and 10 mm height, and then, the web was rolled on a core to obtain Film B-201. The amount of the residual solvent just after production of Film B-201 was 0.1%. The film thickness was 80 μm and the length of the rolled film was 4000 m. Film B-201 exhibited an Ro of 4 nm and an Rth of 52 nm, the results of which are shown in Table 2.

Films 202 to 208 were prepared in the same manner as Film 201 except that: (i) amounts of added Tinuvin 109, Tinuvin 171, Tinuvin 326, an stabilizer and a retardation increasing agent; and (iii) film thicknesses, were changed as listed in Table 2. The stretching factor in the TD direction (using a tenter) was in the range of 1.25 to 1.45 and adjusted so that retardation values Ro and Rth of each film fell to within the values listed in Table 2. Each film was dried so that the amount of the residual solvent in the film just after the production was not more than 0.1%.

A UV absorber, a stabilizer and a retardation increasing agent were separately extracted from each of Films 201 to 206 to determine the amount of each of these additives contained in 1 $m^2$ of each film by means of high-performance liquid chromatography, gas chromatography, or mass spectroscopy, taking into account film thickness and weight of each film. Each determined value was also converted to a value of % by weight based on the weight of the film forming resin, which was cellulose acetate in the present invention. The film thicknesses, amounts of UV absorber (sum of all the compounds), an stabilizer and a retardation increasing agent contained in 1 $m^2$ of the film are listed in Table 2.

The concentrations of a plasticizer contained in Films 201 to 206 were also determined and found to be in the range of 10.2 to 10.8% by weight.

TABLE 2

| Film No. | Acetylation degee (%) | Film thickness (μm) | UV absorber (g/m²) | Stabilizer* (g/m²) | Retardation increasing agent** (g/m²) | Ro (nm) | Rth (nm) |
|---|---|---|---|---|---|---|---|
| 201 | 60.1 | 80 | 1.2 | 0 | 0 | 4 | 52 |
| 202 | 60.1 | 80 | 0 | 0 | 1.2 | 41 | 103 |
| 203 | 60.1 | 80 | 0 | 0.11 | 1.2 | 41 | 103 |
| 204 | 60.1 | 80 | 1.2 | 0 | 2.0 | 75 | 210 |
| 205 | 60.1 | 115 | 0 | 0 | 3.5 | 72 | 430 |
| 206 | 58.0 | 70 | 0 | 0 | 1.7 | 48 | 101 |

*tribenzylamine
**triazine derivative of the above structure (Preparation of Polarizing Plate)

Using the cellulose ester films prepared in Example 1, the following saponification treatments and preparation of polarizing plates were carried out.

other surface of each polarizing element, one of Films 201 to 206, which were also alkali saponified, was adhered, the combination of Film A (Films 101 to 108) and Film B (Films 201 to 206) being shown in Table 3.

TABLE 3

| Polarizing Plate No. | Film A | Film B | Image quality | Degradation test 1 UV irradiation | Degradation test 2 Resistance 1/Resistance 2 | Quality of moving picture | Remarks |
|---|---|---|---|---|---|---|---|
| 301 | 101 | 201 | C | A | A/A | C | Comp. |
| 302 | 106 | 202 | A | C | A/A | C | Comp. |
| 303 | 101 | 202 | A | A | A/A | A | Inv. |
| 304 | 101 | 203 | A | A | A/A | A | Inv. |
| 305 | 102 | 203 | A | B | B/A | B | Inv. |
| 306 | 103 | 204 | B | B | B/B | B | Inv. |
| 307 | 104 | 204 | B | A | B/B | B | Inv. |
| 308 | 105 | 202 | A | B | A/A | A | Inv. |
| 309 | 107 | 201 | C | A | C/A | C | Comp. |
| 310 | 106 | 205 | C | C | C/C | C | Comp. |
| 311 | 108 | 202 | A | A | B/A | B | Inv. |
| 312 | 101 | 206 | A | A | B/B | B | Inv. |

Inv.: Present invention
Comp.: comparative sample (Alkali saponification treatment)

| Saponification process | 2M-NaOH | 50° C., 90 seconds |
| Washing process | Water | 30° C., 45 seconds |
| Neutralization process | 10 wt % HCl | 30° C., 45 seconds |
| Washing process | Water | 30° C., 45 seconds |

The saponification process was followed by washing, neutralization, washing and drying at 80° C., in that order.

(Preparation of Polarizing Element)

A long roll of polyvinyl alcohol film with a thickness 120 μm was immersed in an aqueous solution of 1 weight part of iodine and 4 weight parts of boric acid in 100 weight parts of water, followed by stretching at 50° C. by a factor of 6 in the MD direction (the film conveying direction) to a polarizing element.

Polarizing Plates 301 to 312 were prepared as follows: each of Films 101 to 108, which were alkali saponified as described above, was adhered on one surface of the above described polarizing element using a 5% aqueous solution of fully saponified polyvinyl alcohol as an adhesive. On the (Evaluation of Image Quality: Measurement of Viewing Angle of the VA Mode Liquid Crystal Display)

Liquid crystal display VL-1530S produced by Fujitsu Inc. was placed with the display surface being horizontal. The original polarizing plate used in the display was removed and each of the polarizing plates listed in Table 3 was adhered so that the transmission axis of the polarizing plate lay in the same direction as that of the original polarizing plate. Two identical polarizing plates for each sample listed in Table 3 were prepared. One of them was used on the observing side of the liquid crystal cell and the other was used on the back light side as illustrated in FIG. 3, where 1a represents Film A1, 1b represents Film A2, 2a represents Film B1, 2b represents Film B2, 5a and 5b represent polarizing elements, 3a and 3b each represents the direction of slow axis of the film, 4a and 4b each represents the direction of transmission axis of a polarizing element, 6a and 6b each represents a polarizing plate, 7 represents a liquid crystal cell and 9 represents a liquid crystal display. Each polarizing plate was placed so that each of Film B were adjacent to the liquid crystal cell.

Evaluation of viewing angle properties of a liquid crystal display panel (having an improved viewing angle) incorporating an elliptical polarizing plate of the present invention was carried out by measuring a viewing angle using EZ-contrast (manufactured by ELDIM).

A viewing angle is designated as an angle between a direction of the normal line of the display panel and a direction where the contrast (the ratio of transmittance of (white/black)) is not less than 10. Since a normal line corresponds to 0 degree, a larger value means a wider viewing angle.

The contrast value at 45° was used for an evaluation of the liquid crystal display panel, provided that the horizontal direction was assumed to be 0°.
  A: The viewing angle is 80° or more.
  B: The viewing angle is 70° or more and less than 80°.
  C: The viewing angle is less than 70°.

(Degradation Test)

Degradation Test 1 (Irradiation of UV Rays)

A polarizing plate identical to one of the polarizing plates listed in Table 3 was adhered on a glass plate with an acrylic glue, and accelerated degradation was carried out under irradiation of a 70,000 lux light at 40° C. for 500 hours using a xenon long-life weather meter.

A polarizing plate subjected to the accelerated degradation test was peeled from the glass plate and cut into two pieces. These pieces were placed in a cross Nicole state at an ambient temperature and polarizability was visibly observed. Polarizability was confirmed when the polarizing plate looked dark.

Evaluation was carried out by comparing with polarizing behavior in a cross Nicole state of polarizing plates which were not subjected to the accelerated degradation test. The results are shown in Table 3.

(Difference in Polarizability Between Before and After the Degradation Test 1)
  A: Almost no difference was observed.
  B: A slight degradation was observed, however, the plate exhibited a sufficient polarizability.
  C: Polarizability was hardly observed.

Degradation Test 2

(Resistance Test Under High Temperature and High Humidity Conditions)

A polarizing plate identical to one of the polarizing plates listed in Table 3 was subjected to a resistance test under a high temperature and high humidity, in which the polarizing plate was kept at 60° C. under a humidity of 90% RH for 500 hours.

After the high temperature and high humidity treatment, the polarizing plate was kept at 23° C. under a humidity of 55% RH for 24 hours. Then the polarizing plate was placed on a back light with Film B adjacent to the back light, and observed from the Film A side and a normal angle to the plate.

(Resistance 1)
  A: Almost no difference was observed between before and after the treatment.
  B: A slight white turbidity was observed in the film after the treatment, however, not a problem for practical use.
  C: White turbidity was clearly observed.

A polarizing plate subjected to a high temperature and high humidity treatment was cut into two pieces and kept at 23° C. under 55% RH for 24 hours. Then the polarizing plates were piled together with two Films A being adjacent to each other and at a cross Nicole state. The polarizabilities of the polarizing plates were visibly observed from a normal angle to the polarizing plates.

Next, the two polarizing plates were piled together with two Films B being adjacent to each other and at a cross Nicole state and placed on a back light. The polarizability of the plates were visibly observed from a normal angle to the polarizing plates.

(Resistance 2)
  A: Negligible degradation was observed.
  B: Slight degradation was observed, however, the polarizing plates looked sufficiently dark.
  C: Bright spots were observed in the polarizing plates, and not suitable for practical use.

(Evaluation of Moving Picture)

Polarizing Plates 301 to 312 were fixed on a glass plate using clips and irradiated with UV rays under the same condition as Degradation Test 1 except that the duration of UV irradiation was 100 hours, instead of 500 hours.

The polarizing plate after being subjected to the above UV irradiation were then subjected to the same high temperature and high humidity treatment as described in Degradation test 2, followed by keeping the polarizing plates at 23° C. under 55% RH for 24 hours.

The polarizing plates thus treated were laminated on liquid crystal displays VL-1530S, produced by Fujitsu Inc., in the same manner as described in the evaluation of image quality. Evaluation of moving picture images was carried out by displaying a moving picture recorded from a TV program using a personal computer, and by watching the images for 2 minutes from the frontal direction, 3 m from the display.
  A: No eye strain was felt while watching nor just after watching. Also, no unpleasant sensation was felt.
  B: A slight eye strain was felt after watching, however, no unpleasant sensation was felt.
  C: A notable unpleasant sensation to the image and eye strain were felt while watching the picture.

The polarizing plate of the present invention exhibited noticeably improved resistance to irradiation of UV rays and to storage under high temperature and high humidity conditions. The image quality of the liquid crystal display having the polarizing plate of the present invention was also found to be improved, together with the improvements in the above described durability.

In the above evaluation, when the same polarizing plates were used for both the observing side surface and for the back light side surface of a liquid crystal cell, the contrast on the display was left-right symmetrical, however, when different polarizing plates were used, namely, Polarizing plate 306 was used on the observing side and Polarizing plate 305 was used on the back light side of the liquid crystal cell, the contrast was left-right asymmetrical. The asymmetrical feature of the display caused a slight unpleasant sensation to the display image, while a sufficient image quality and durability of the polarizing plate were obtained. Accordingly, it is clear that the polarizing plates of the present invention (Film A/polarizing element/Film B) used in the observing side surface and in the back light side surface of a liquid crystal cell are preferably the same.

Example 2

(Measurement of Viewing Angle of TN Mode Liquid Crystal Display)

An optical film and polarizing plates of a 15-inch size liquid crystal display Multi Sync LCD 1525J produced by NEC Corp. were removed and the polarizing plate of the present invention was laminated so that the transmission axis of the polarizing plate of the present invention lay in the same direction as that of the removed polarizing plate.

Evaluation of the viewing angle property of a liquid crystal display panel having (viewing angle improving) elliptically polarizing plates of the present invention was carried out by measuring the viewing angle using EZ-contrast (manufactured by ELDIM).

The method of evaluating the viewing angle was the same as described in Example 1. Superiority in the image quality of a liquid crystal display employing the polarizing plate of the present invention was obvious when a contrast in a direction of 0° was measured.

What is claimed is:

1. A polarizing plate provided on a surface of a liquid crystal cell of a display, comprising a polarizing element, Film A is provided on one surface of the polarized element, and Film B is provided on the other surface of the polarizing element; wherein Film B is located closer to the liquid crystal cell than Film A in the display; wherein Film A contains a greater amount of a total weight of an ultraviolet absorber and a stabilizer relative to Film B, and Film B contains a greater amount of a retardation increasing agent relative to Film A; and wherein the polarizing plate meets the following conditions (1) to (4):

Condition (1): Film A and Film B meet Formula (I) and (II):

$$0 \leq Wb < Wa \quad \text{Formula (I):}$$

$$0.1 \ (g/m^2) < Wa \leq 3.0 \ (g/m^2) \quad \text{Formula (II):}$$

wherein Wa is equal to a total weight in $g/m^2$ of a ultraviolet absorber and a stabilizer contained in 1 $m^2$ of Film A, and Wb is equal to a total weight in $g/m^2$ of a ultraviolet absorber and a stabilizer contained in 1 $m^2$ of Film B;

Condition (2): Film A and Film B meet Formula (III) and (IV):

$$0 \leq Ra < Rb \quad \text{Formula (III):}$$

$$0.1 \ (g/m^2) < Rb \leq 3.0 \ (g/m^2) \quad \text{Formula (IV):}$$

wherein Ra is equal to a weight in $g/m^2$ of a retardation increasing agent contained in 1 $m^2$ of Film A, and Rb is equal to a weight in $g/m^2$ of a retardation increasing agent contained in 1 $m^2$ of Film B;

Condition (3): Film B meets the following subconditions (a) and (b):
(a) Ro of Film B is defined by Formula (V) is not less than 20 nm and not more than 95 nm; and
(b) Rth of Film B is defined by Formula (VI) is not less than 70 nm and not more than 400 nm;

wherein Ro and Rth are measured at a wavelength of 590 nm at a humidity of 55% RH at 23° C., and $$Ro=(nx-ny)\times d \quad \text{Formula (V):}$$

$$Rth=((nx+ny)/2)-nz)\times d \quad \text{Formula (VI):}$$

wherein nx represents an in-plane refractive index in a direction of a slow axis, ny represents an in-plane refractive index in a direction of a fast axis, nz represents an out-of-plane refractive index in a thickness direction, and d represents a thickness of Film B; and Condition (4): Film A and Film B are cellulose ester films.

2. The polarizing plate of claim 1, wherein a surface of Film B has an adhesive layer which adheres the polarizing plate to the liquid crystal cell.

3. The polarizing plate of claim 1, wherein Film A and Film B meet Formula (VII) and Formula (VIII), respectively.

$$0.1 \ (g/m^2) < (Wa+Ra) \leq 3.0 \ (g/m^2) \quad \text{Formula (VII):}$$

$$0.1 \ (g/m^2) < (Wb+Rb) \leq 3.0 \ (g/m^2) \quad \text{Formula (VIII):}$$

4. The polarizing plate of claim 1, wherein at least one of Film A and Film B contains a plasticizer, a concentration of the plasticizer being not less than 0.5% by weight and less than 20% by weight based on the total weight of the film.

5. The polarizing plate of claim 1, wherein for at least one of Film A and Film B, the cellulose ester forming the film is a cellulose acetate having an acetylation degree in the range of 59.0 to 61.5%.

6. The polarizing plate of claim 1, wherein Film A and Film B contain a benzophenone derivative or a benzotriazole derivative as the ultraviolet absorber.

7. The polarizing plate of claim 1, wherein the retardation increasing agent is a compound containing a 1,3,5-triazine ring.

8. The polarizing plate of claim 1, wherein the retardation increasing agent is a 1,4-cyclohexanedicarboxylic acid diphenylester derivative.

9. The polarizing plate of claim 1, wherein at least one of Film A and Film B is a film which is formed by a flow casting method and a retardation value of the film is controlled by stretching while a residual solvent is present in the film.

10. The polarizing plate of claim 1, wherein Film A and Film B are adhered to the polarizing element through a saponification treatment.

11. The polarizing plate of claim 1, wherein retardation values of Film A and Film B are different from each other.

12. The polarizing plate of claim 1, wherein Film B meets 30 nm $\leq$ Ro $\leq$ 70 nm.

13. The polarizing plate of claim 1, wherein Film B meets 90 nm $\leq$ Rth $\leq$ 200 nm.

14. The polarizing plate of claim 1, wherein the polarizing plate is provided as a roll film type polarizing plate, a transmission axis of the roll film type polarizing plate being substantially parallel to a longitudinal direction of the roll film type polarizing plate and the slow axis of Film B being substantially parallel to a lateral direction of the roll film type polarizing plate.

15. A liquid crystal display comprising the polarizing plate of claim 1.

16. The liquid crystal display of claim 15, wherein the liquid crystal display is a multi-domain mode liquid crystal display.

17. The liquid crystal display of claim 15, wherein the liquid crystal display is a vertically aligned liquid crystal display.

18. The liquid crystal display of claim 15, comprising two polarizing plates, Polarizing Plate 1 and Polarizing Plate 2, which meet said conditions (1) to (4), wherein:
(a) Polarizing Plate 1 comprises:
(i) Film A1 which meets said conditions imposed on said Film A,
(ii) Polarizing Element 1, and
(iii) Film B1 which meets said conditions imposed on said Film B, stacked in the same order as listed, and Polarizing Plate 2 comprises:
(iv) Film A2 which meets said conditions imposed on said Film A,
(v) Polarizing Element 2, and
(vi) Film B2 which meets said conditions imposed on said Film B, stacked in the same order as listed;
(b) Polarizing Plate 1, the liquid crystal cell and Polarizing Plate 2 are stacked in the same order as listed, wherein (vii) Film B1 is placed adjacent to one surface of the liquid crystal cell, and
(viii) Film B2 is placed adjacent to the other surface of the liquid crystal cell;

(c) A transmission axis of Polarizing Plate 1 is orthogonal to a transmission axis of Polarizing Plate 2;

(d) Film B1 and Film B2 are essentially the same; and (e) A slow axis of each of Film B1 and Film B2 is almost parallel to a transmission axis of the respective adjacent polarizing element.

19. The liquid crystal display of claim 15, wherein a moving picture with color images is displayed.

* * * * *